US007177860B2

(12) United States Patent
Ejima et al.

(10) Patent No.: US 7,177,860 B2
(45) Date of Patent: Feb. 13, 2007

(54) INFORMATION PROCESSING SYSTEM, METHOD AND RECORDING MEDIUM FOR CONTROLLING SAME

(75) Inventors: Satoshi Ejima, Tokyo (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 222 days.

(21) Appl. No.: 10/316,881

(22) Filed: Dec. 12, 2002

(65) Prior Publication Data

US 2003/0088560 A1    May 8, 2003

Related U.S. Application Data

(63) Continuation of application No. 09/524,566, filed on Mar. 13, 2000, now abandoned, which is a continuation of application No. 08/965,183, filed on Nov. 6, 1997, now abandoned.

(60) Provisional application No. 60/052,982, filed on Jul. 11, 1997.

(30) Foreign Application Priority Data

May 13, 1997    (JP) .................................. 9-122010

(51) Int. Cl.
   *G06F 17/00* (2006.01)
(52) U.S. Cl. .................................. 707/3; 707/6; 707/4
(58) Field of Classification Search ............... 707/3–6, 707/100–104.1; 725/135–142
See application file for complete search history.

(56) References Cited

U.S. PATENT DOCUMENTS

| 5,648,760 A | 7/1997 | Kumar |
| 5,828,575 A | 10/1998 | Sakai |
| 5,864,482 A | 1/1999 | Hazama et al. |
| 5,886,897 A | 3/1999 | Hazama et al. |
| 6,075,950 A | 6/2000 | Stephenson |
| 6,104,861 A | 8/2000 | Tsukagoshi |
| 6,335,722 B1 | 1/2002 | Tani et al. |

OTHER PUBLICATIONS http://www.videomaker.com/scripts/article_print.cfm?id=1576.*
http://www.dmnforums.com/cgi-bin/displaywwugpost.fcgi?forum=dv_rack&post=040802013306.htm.*
Identifying result subdocuments of XML search conditions; Kinutani, H.; Yoshikawa, M.; Uemura, S.; Digital Libraries: Research and Practice, 2000 Kyoto, International Conference on. Nov. 13-16 2000 page(s):254-261.*
On implicate discovery and query optimization; Vorwerk, K.; Paulley, G.N.; Database Engineering and Applications Symposium, 2002. Proceedings. International Jul. 17-19, 2002 page(s):2-11.*

(Continued)

*Primary Examiner*—David Jung
(74) *Attorney, Agent, or Firm*—Oliff & Berridge, PLC

(57) ABSTRACT

An information processing system, method and recording medium for use therewith enables a user to search for (and locate) different types of information contained in a plurality of information files. The search is conducted on the basis of the types of information that are designated, The types of information can be directly designated or indirectly designated, e.g., by designating an information file. When an information file is designated, the designated type(s) of information corresponds to the type(s) of information contained in the designated information file. The located information can then be reproduced, e.g., on a display screen.

22 Claims, 13 Drawing Sheets

OTHER PUBLICATIONS

Dynamic construction of product taxonomy hierarchies for assisted shopping in the electronic marketplace; Ryu, Y.U.; System Sciences, 1998., Thirty-First Hawaii International Conference on vol. 5, Jan. 6-9, 1998 page(s):196-204 vol.5.*

* cited by examiner

INFORMATION PROCESSING SYSTEM, METHOD AND RECORDING MEDIUM FOR CONTROLLING SAME

This is a Continuation of application Ser. No. 09/524,566 filed Mar. 13, 2000, now abandoned which in turn is a Continuation of application Ser. No. 08/965,183 filed Nov. 6, 1997 now abandoned. The entire disclosure of the prior application(s) is hereby incorporated by reference herein in its entirety.

RELATED PROVISIONAL APPLICATION

This non-provisional application claims the benefit of Provisional Application No. 60/52,982, filed Jul. 11, 1997.

INCORPORATION BY REFERENCE

The disclosure of the following priority application is herein incorporated by reference: Japanese Patent Application No. 9-122010, filed May 13, 1997.

BACKGROUND OF THE INVENTION

1. Field of Invention

The present invention relates to an information processing apparatus, method and recording medium for controlling same, and in particular relates to an information processing apparatus, method and recording medium that makes it possible to sequentially reproduce only specific information from a plurality of information files, each of which includes a plurality of different types of information.

2. Description of Related Art

In recent years, use of electronic cameras that shoot the image of an object using a CCD or the like and that record the image in an internal memory or on removable memory cards or the like after converting the image into digital data has become common in place of cameras that use film. An image photographed with such an electronic camera may be reproduced immediately and displayed on the screen of an LCD or CRT or the like without going through the processes of development and printing, which are required by a conventional (film using) camera.

In addition, there are devices in which it is possible, after reproducing a specific image, to successively reproduce the succeeding images by operating an arrow key or the like.

However, it is impossible to successively reproduce only a specific type or a plurality of specified types of information contained in a plurality of information files that include one or more different types of information, for example image information and audio information.

SUMMARY OF THE INVENTION

In consideration of the foregoing, it is an object of the present invention to make it possible to successively reproduce one or a plurality of specific types of information in information files that include a plurality of different types of information.

According to one embodiment of the invention, an information processing apparatus reproduces specific information from a plurality of information files that include a plurality of different types of information. The apparatus includes a designating means (e.g., a pen and touch tablet) for designating one or a plurality of types of information. The apparatus also includes search means (e.g., a CPU or other controller) for searching the information files on the basis of the types of information designated by the designating means. The apparatus also includes reproduction means (e.g., a display and/or a speaker) for reproducing the different types of information designated by the designating means located in the information files by the search means.

The search means can search for (and identify) information files containing all of the different types of information designated by the designating means.

Alternatively, the search means can search for (and identify) information files containing at least one (i.e., any) of the different types of information designated by the designating means.

As an alternative to directly designating one or more different types of information, the designating means can (indirectly) designate one or more different types of information by designating an information file. The search means then searches the information files on the basis of the type or types of information contained in the designated information file designated by the designating means. The reproduction means then reproduces the types of information located in the information files by the search means that is similar to the information in the designated file.

The search means can search for (and identify) information files containing all of the different types of information contained in the designated information file designated by the designating means.

Alternatively, the search means can search for (and identify) information files containing at least one (i.e., any) of the different types of information contained in the designated information file designated by the designating means.

The information can be, for example, image information (e.g., of a photographed object), line drawing information or audio information.

The recording medium stores a computer-readable control program for controlling an information processing apparatus to operate as detailed above. The control program includes instructions enabling the information processing apparatus to perform the following acts: receive a designation of one or a plurality of different types of information; search a plurality of stored information files on the basis of the designated information types; and reproduce the different types of information located in the information files by the search.

The recording medium can include instructions enabling the one or more different types of information to be directly designated or indirectly designated by designation of a particular information file. When indirectly designated, i.e., when a particular information file is designated, the search is performed based on the type or types of different information contained in the designated information file.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A configuration of an embodiment of the present invention is described hereafter with reference to the drawings.

Figure 1:
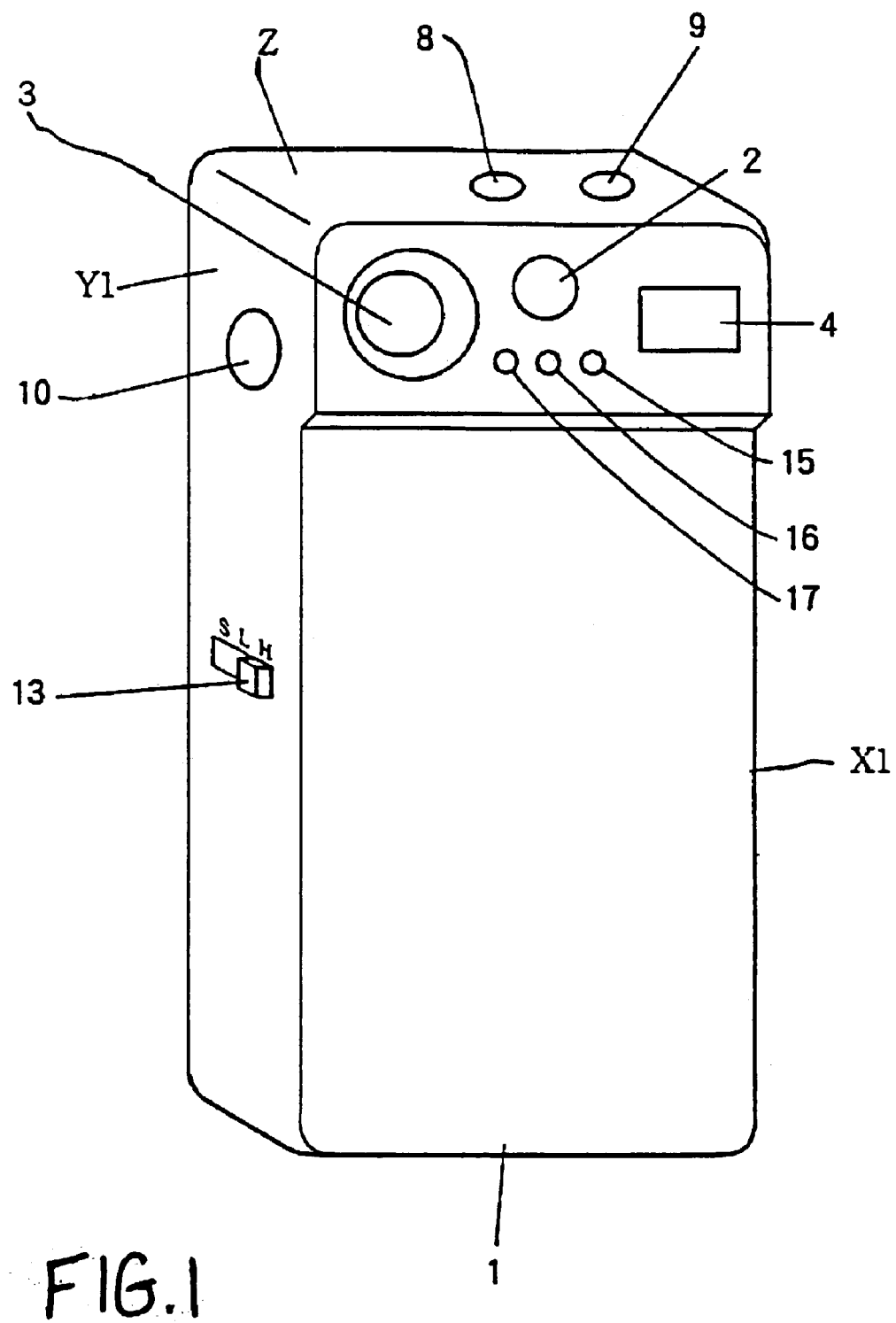
FIG. 1 is a perspective, front view of an electronic camera according to an embodiment of the present invention.
Figure 2:
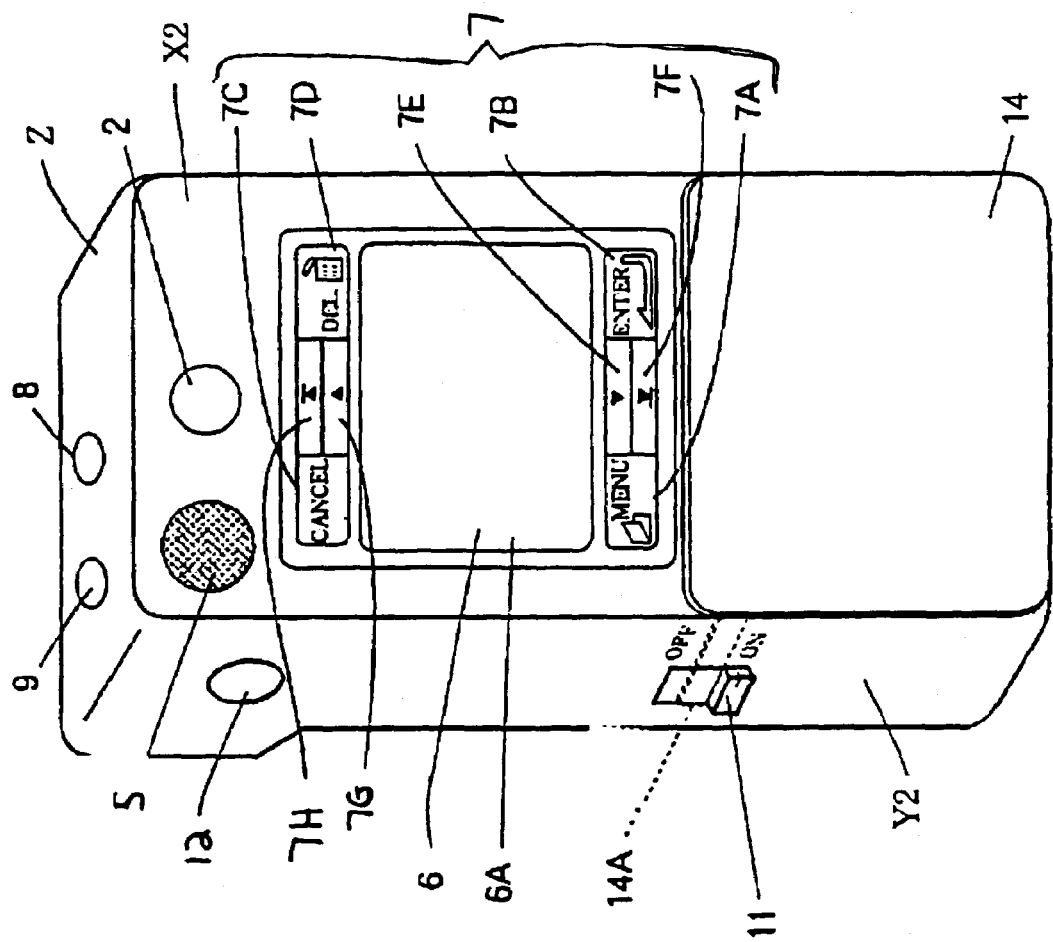
FIG. 2 is a perspective, rear view of the FIG. 1 electronic camera with its LCD cover open.

FIG. 1 and FIG. 2 are perspective views of an example of a configuration of an embodiment of an electronic camera to which the present invention is applied. With the electronic camera of FIGS. 1–2, the surface facing the object to be photographed is defined as surface X1 and the surface facing the user during photography is defined as surface X2. On the top edge section of the surface X1 are provided a viewfinder 2, a shooting lens 3 and a light emitting unit (strobe) 4. The viewfinder 2 is used to verify the shooting range of the object. The shooting lens 3 takes in the optical (light) image of the object. The light emitting unit 4 emits light to illuminate the object.

Additionally provided on the surface X1 are a photometry device 16, a red-eye reducing (RER) LED 15 and a colorimetry device 17. The photometry device 16 measures light prior to the time that the photographic image is captured by a CCD 20 (see FIG. 4) as is well known. The red-eye reducing LED 15 reduces red eye by emitting light before the strobe 4 is caused to emit light. The colorimetry device 17 measures color during the time when operation of the CCD 20 is stopped (prior to photographing the object).

On the top edge section of the surface X2 (a position corresponding to the top section of the surface X1 where the viewfinder 2, the shooting lens 3 and the light emitting unit 4 are formed) are provided the viewfinder 2 and a speaker 5, which outputs sound recorded in the electronic camera 1. An LCD 6 and operation key area 7 are formed in the surface X2 vertically below the viewfinder 2, the shooting lens 3, the light emitting unit 4 and the speaker 5. On the surface of the LCD 6, a so called touch tablet 6A is arranged. The touch tablet 6A outputs position data corresponding to the position designated by a touching operation of a pen type pointing device, which will be explained later.

The touch tablet 6A is made of transparent material such as glass or resin so that the user can view an image displayed on the LCD 6, which is formed beneath the touch tablet 6A, through the touch tablet 6A.

Figure 6:
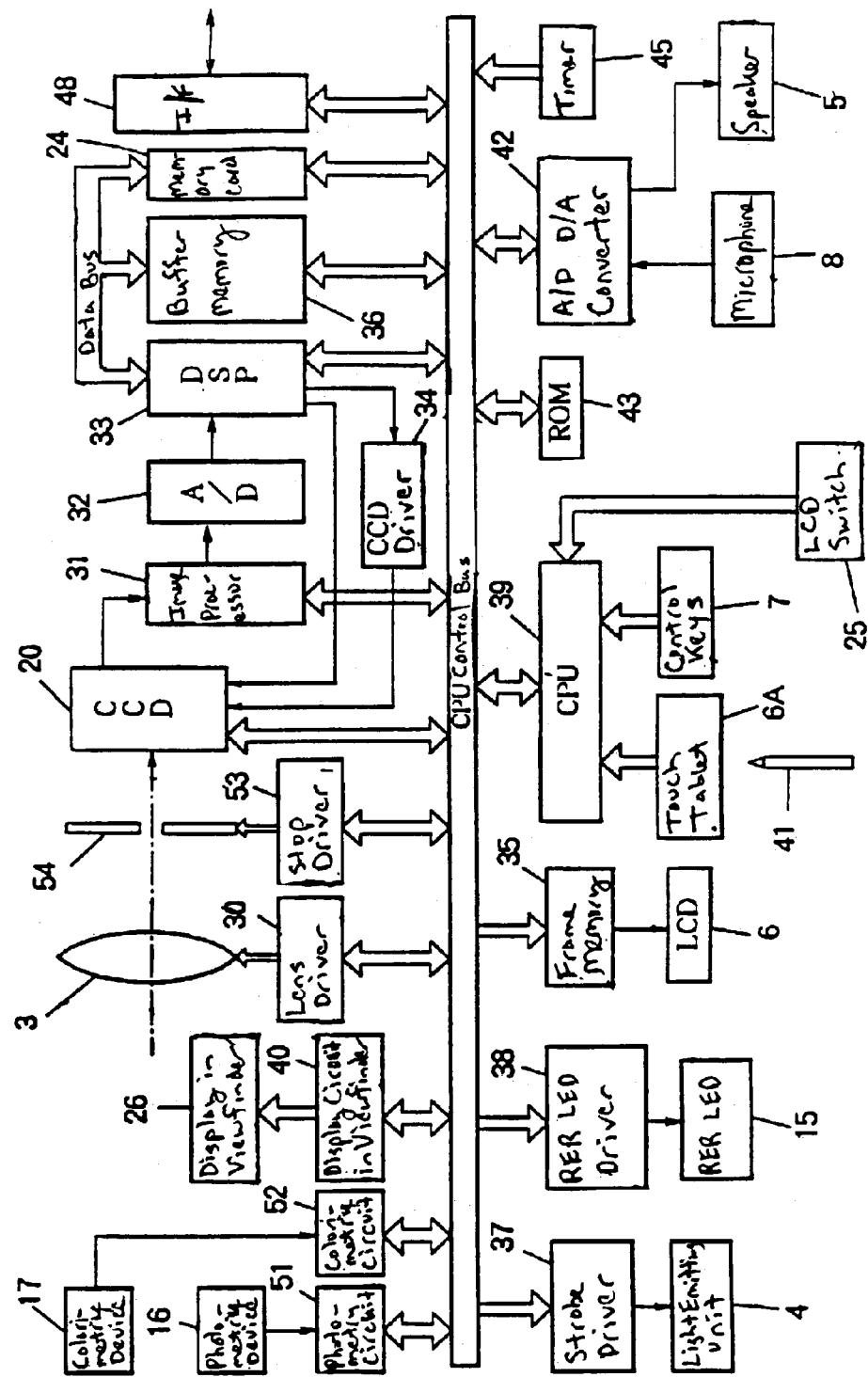
FIG. 6 is a block diagram of an internal electrical structure of the FIG. 1 electronic camera.

The control key area 7 includes keys that are operated in order to reproduce and display recorded data on the LCD 6, and detect the operation (input) by the user to supply the user's input to the CPU 39 (central processing unit) shown in FIG. 6.

The menu key 7A is operated to display the menu screen on the LCD 6. The execution key 7B is operated to reproduce the recorded information selected by the user. The cancel key 7C is operated to interrupt the process of reproducing the recorded information. The delete key 7D is operated to delete the recorded information. The scroll keys 7E through 7H are operated to scroll the screen vertically when the recorded information is displayed on the LCD 6 as a table.

Figure 3:
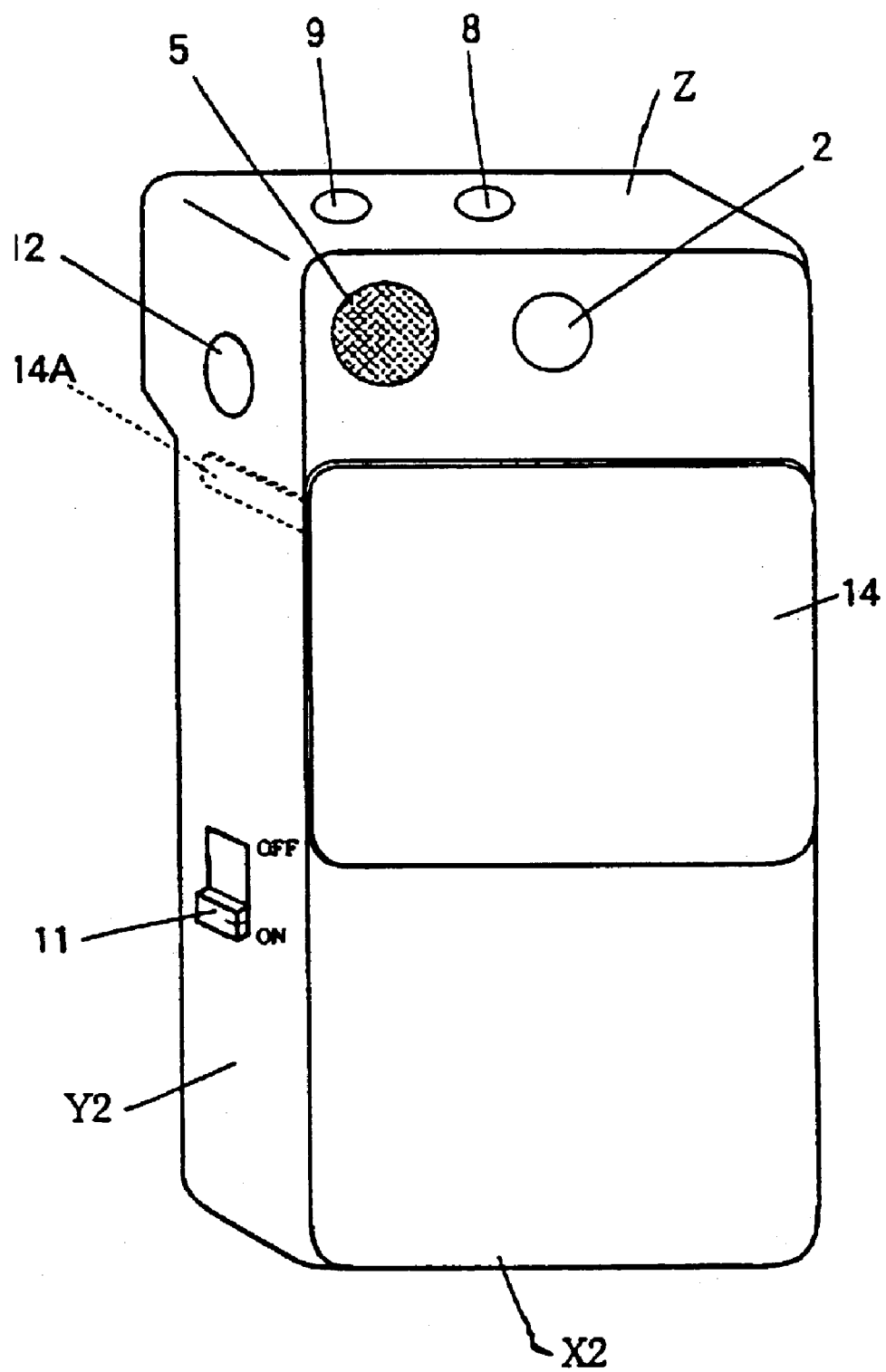
FIG. 3 is a perspective, rear view of the FIG. 1 electronic camera with its LCD cover closed.

The LCD cover 14 is freely slidable on the surface X2 to protect the LCD 6 when it is not in use. When moved upward in the vertical direction, the LCD cover 14 covers the LCD 6 and the touch tablet 6A as shown in FIG. 3. When the LCD cover is moved downward in the vertical direction, the LCD 6 and the touch tablet 6A are exposed, and the power switch 11 (to be described later), which is arranged on the surface Y2 is switched to the on-position by an arm member 14A of the LCD cover 14.

A microphone 8 and an earphone jack 9, to which an unillustrated earphone can be connected, are provided on the surface Z, which is the top surface of the electronic camera 1.

A release switch 10, which is operated to shoot (i.e., photograph) an object, and a continuous shooting mode switch 13, which is operated in switching the continuous shooting mode during photography are provided on the left side surface Y1. The release switch 10 and the continuous shooting mode switch 13 are arranged vertically below the viewfinder 2, the shooting lens 3 and the light emitting unit 4, which are provided on the top edge section of the surface X1.

A recording switch 12, which is operated to record sound, and the power switch 11 are provided on the right surface Y2. As with the release switch 10 and the continuous shooting mode switch 13 described above, the recording switch 12 and the power switch 11 are arranged vertically below the viewfinder 2, the shooting lens 3 and the light emitting unit 4, which are provided in the top edge section of the surface X1.

The recording switch 12 and the release switch 10 preferably are formed virtually at the same height so that the user does not feel any difference when the camera is held either by the right hand or the left hand. Alternatively, the height of the recording switch 12 and of the release switch 10 may be different so that the user does not accidentally press the switch provided on the opposite side surface when the other switch is pressed while the user's fingers hold the other side surface to offset the moment created by the pressing of the switch.

The continuous shooting mode switch 13 is actuated when the user determines whether to shoot one frame or several frames of the object each time the release switch 10 is pressed. For example, if the indicator of the continuous shooting mode switch 13 is pointed to the position printed "S" (in other words, when the switch is changed to the S mode), and the release switch 10 is pressed, the camera shoots only one frame. When the indicator of the continuous shooting mode switch 13 is pointed to the position printed "L" (in other words, when the switch is changed to the L mode), and the release switch 10 is pressed, the camera shoots eight frames per second as long as the release switch 10 is pressed (namely, the low speed continuous shooting mode is enabled). When the indicator of the continuous shooting mode switch 13 is pointed to the position printed "H" (in other words, when the switch is changed to the H mode), and the release switch 10 is pressed, the camera shoots 30 frames per second as long as the release switch 10 is pressed (namely, the high speed continuous shooting mode is enabled).

Figure 4:
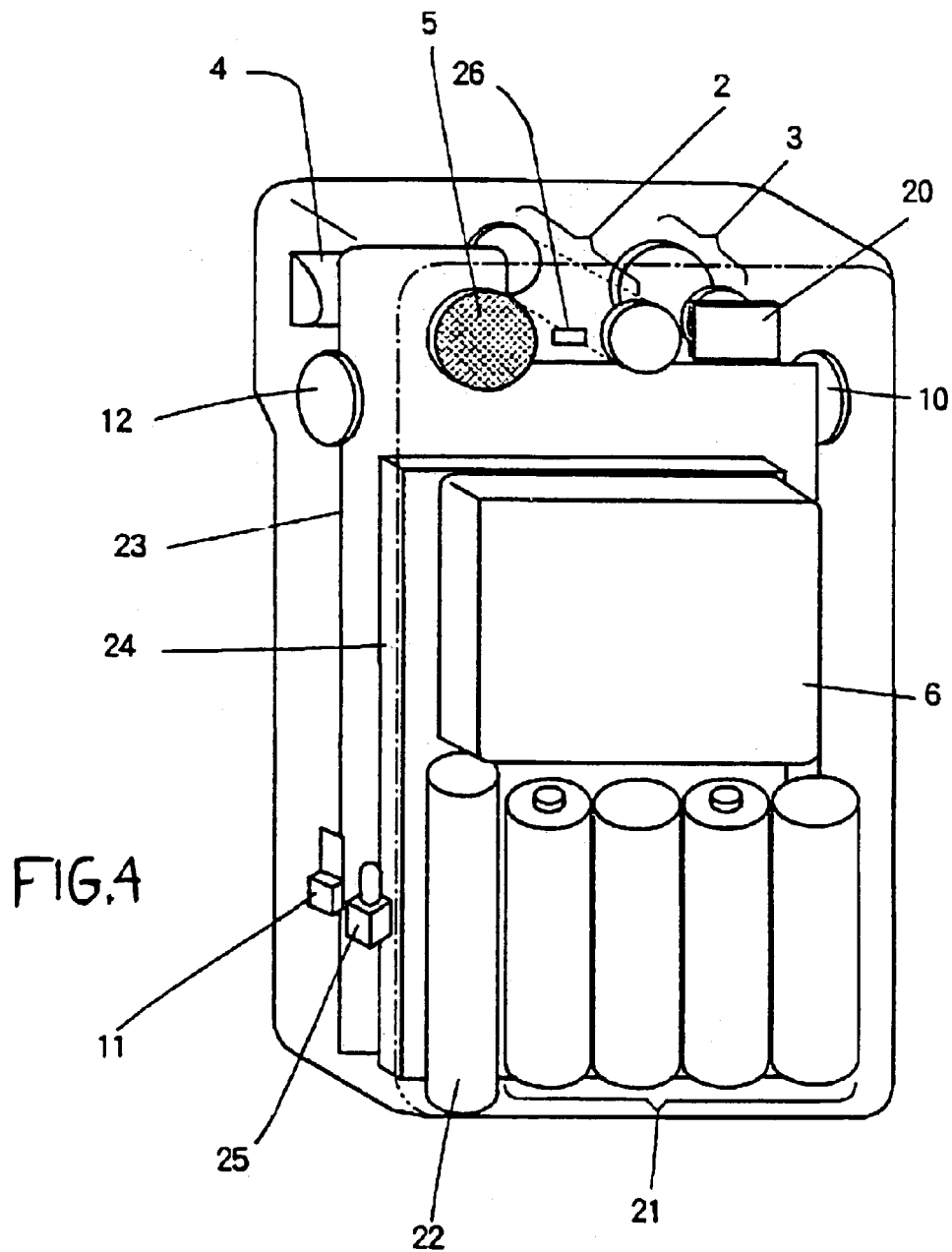
FIG. 4 is a perspective, rear view of the FIG. 1 electronic camera, showing some of the inside components of the electronic camera.

The internal structure of the electronic camera 1 is now described. FIG. 4 is a perspective view of an example of some of the internal structure of the electronic camera shown in FIG. 1 and FIG. 2. The CCD 20 is provided behind the shooting lens 3. The optical image of the object imaged through the shooting lens 3 is formed on the CCD 20, which photoelectrically converts the light image to electric signals (image signals).

The display device 26 in the viewfinder is arranged inside the visual screen of the viewfinder 2 and displays, e.g., the setting conditions and the like of various functions for the user who views the object through the viewfinder 2.

Four cylindrical batteries (for example, AA dry cell batteries) 21 are placed side by side vertically below the LCD 6. The electric power stored in the batteries 21 is supplied to each part of the camera. A capacitor 22 is provided below the LCD 6 and next to the batteries 21 to accumulate electric charge that is used to cause the light emitting unit 4 to emit light.

Various control circuits are formed on a circuit board 23 to control each part of the electronic camera 1. A removable memory card 24 is provided between the circuit board 23, the LCD 6 and the batteries 21 so that various information to be input in the electronic camera 1 are recorded in preassigned areas of the memory card 24.

Figure 5A:
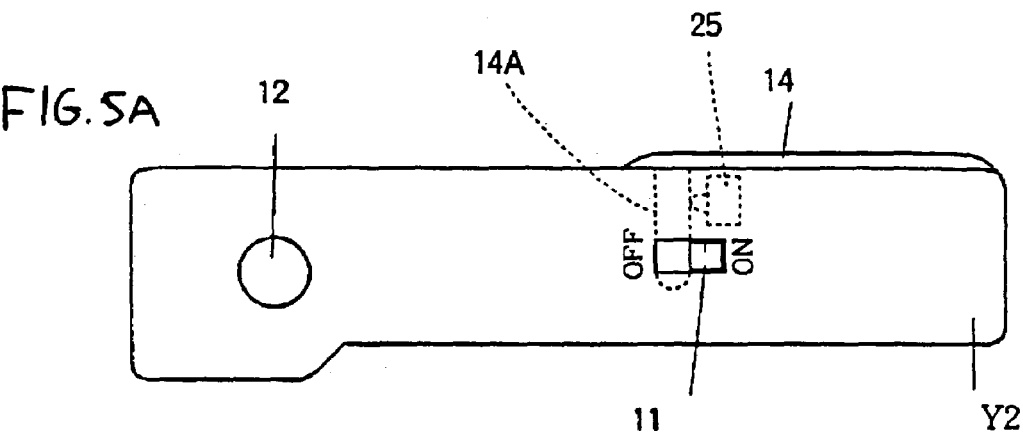
FIGS. 5A–C are side views of the electronic camera, illustrating operation of an LCD switch and LCD cover.

An LCD switch 25 is arranged adjacent to the power source switch 11 and turns on only when its plunger is pressed (placing it in the ON-state with the power source switch 11) by the arm member 14A of the LCD cover 14. This occurs when the LCD cover 14 is moved vertically downward as shown in FIG. 5A.

Figure 5B:
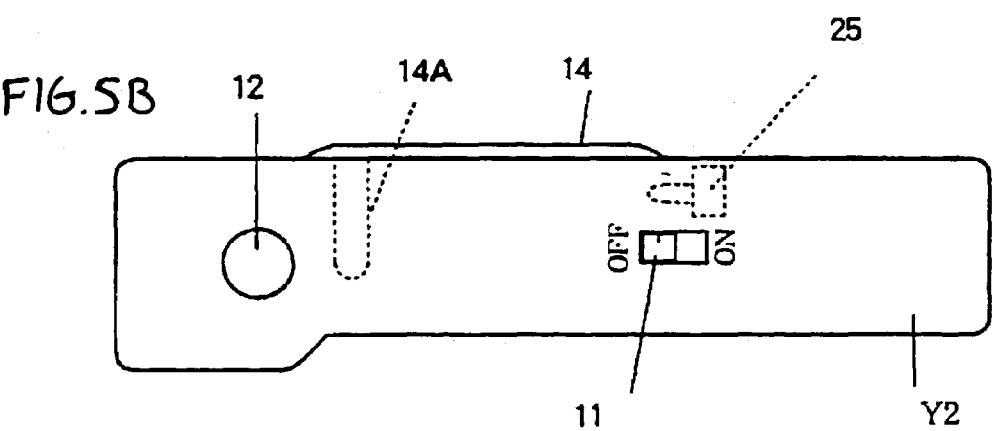
Figure 5C:
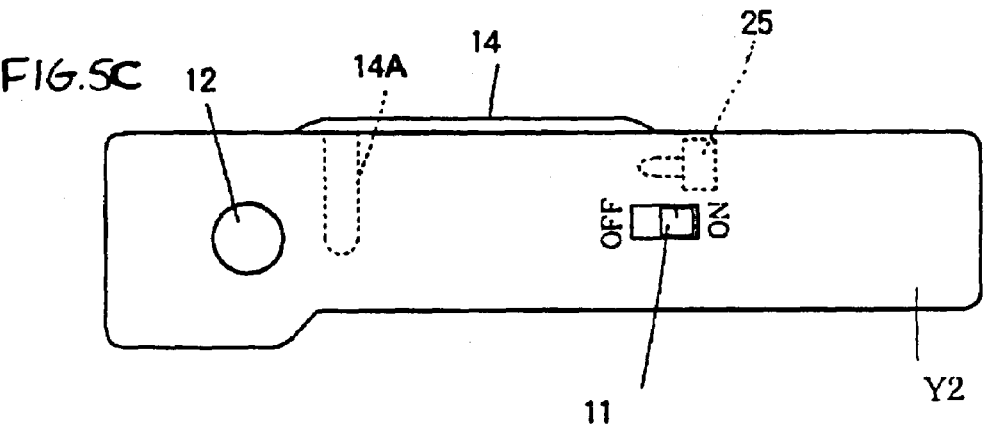

When the LCD cover 14 moves upward vertically, the power source switch 11 can be operated by the user independent of the LCD switch 25. Thus, for example, if the LCD cover 14 is closed and the electronic camera 1 is not being used, the power source switch 11 and the LCD switch 25 are in the OFF-mode as shown in FIG. 5B. In this mode, if the user switches the power source switch 11 to the ON-mode as shown in FIG. 5C, the power source switch 11 is placed in the ON-mode but the LCD switch 25 remains in the OFF-mode. On the other hand, when the power source switch 11 and the LCD switch 25 are in the OFF-mode as shown in FIG. 5B, and if the LCD cover 14 is opened, the power source switch 11 and the LCD switch 25 are placed in the ON-mode as shown in FIG. 5A. Then, when the LCD cover 14 is closed, only the LCD switch 25 is placed in the OFF-mode as shown in FIG. 5C.

In the configuration of the present embodiment, the memory card 24 is made to be removable. However, a memory on which various information can be recorded may also be provided on the circuit board 23. Additionally, various information recorded in the memory (i.e., the memory card 24) may be output to an external personal computer and the like through an interface 48.

Next, the internal electric structure of the electronic camera 1 of the present embodiment is described with reference to the block diagram of FIG. 6. The CCD 20, which includes a plurality of pixels, photoelectrically converts the light image formed on each pixel into image signals (electric signals). A digital signal processor (hereafter referred to as DSP) 33, in addition to supplying CCD horizontal driving pulses to the CCD 20, supplies CCD vertical driving pulses to the CCD 20 by controlling the CCD driving circuit (or driver) 34.

An image processor 31 is controlled by the CPU 39 to sample the image signals photoelectrically converted by the CCD 20 with a predetermined timing, and to amplify the sampled signals to a predetermined level. The CPU 39 controls each part based on one or more control programs stored in ROM (read only memory) 43. An analog/digital converter (hereafter referred to as the A/D converter) 32 digitizes the image signals sampled by the image processor 31 and supplies them to the DSP 33.

The DSP 33 controls a buffer memory 36 and a data bus connected to the memory card 24, to temporarily store the image data supplied from the A/D converter 32 in the buffer memory 36, and then to read the image data stored in the buffer memory 36 to record that image data in the memory card 24. The DSP 33 also causes a frame memory 35 to store image data supplied by the A/D converter 32 so that such image data is displayed on LCD 6. DSP 33 can also cause image data to be read from the memory card 24, to have that image data decompressed, to have the decompressed image data stored in the frame memory 35, and to have the decompressed image data displayed on the LCD 6.

The DSP 33 also actuates the CCD 20 repeatedly to adjust the exposure time until the exposure level of the CCD 20 reaches an appropriate level at the time of starting the electronic camera 1. At this time, the DSP 33 may operate the photometry circuit 51 first, and then compute the initial value of the exposure time of the CCD 20 based on the light receiving level detected by the photometry device 16. By this process, the adjustment of the exposure time for the CCD 20 may be achieved in a short time.

The DSP 33 also executes timing management for data input and output during recording on the memory card 24 and storing decompressed image data in the buffer memory 36. The buffer memory 36 is used to accommodate the difference between the data input/output speed for the memory card 24 and the processing speed of the CPU 39 and the DSP 33.

The microphone 8 inputs sound information and supplies the sound information to the A/D and D/A converter 42. The A/D and D/A converter 42 converts the analog signals (output by microphone 8) to digital signals, and then supplies the digital signals to the CPU 39. The A/D and D/A converter 42 also changes the digital sound data supplied by the CPU 39 to analog signals, and outputs the analog sound signals to the speaker 5.

The photometry device 16 measures the light amount of the object and its surrounding area and outputs the measurement results as analog signals to the photometry circuit 51. The photometry circuit 51 executes a predetermined process on the analog signals (the measurement results) supplied from the photometry device 16, coverts them to digital signals, and outputs the digital signals to the CPU 39.

A color measuring (colorimetry) device 17 measures the color temperature of the object and its surrounding area and outputs the measurement results as analog signals to a colorimetry circuit 52. The colorimetry circuit 52 executes a predetermined process on the analog signals (the color measurement results) supplied from the colorimetry device 17, converts them to digital signals, and outputs the digital signals to the CPU 39.

A timer 45 has an internal clock circuit and outputs data corresponding to the current date and time to the CPU 39.

A stop driving circuit (driver) 53 sets the diameter of the aperture stop 54 to a predetermined value. The stop 54 is arranged between the shooting lens 3 and the CCD 20 and changes the aperture for the light entering from the shooting lens 3 to the CCD 20.

The CPU 39 stops the operation of the photometry circuit 51 and the colorimetry circuit 52 when the LCD cover 14 is open, the run operation of the photometry circuit 51 and the colorimetry circuit 52 when the LCD cover 14 is closed, and the stop operation of the CCD 20 (electronic shutter operation, for example) until the release switch 10 is placed in a half-depressed mode. The CPU 39 receives the light measurement results of the photometry device 16, and receives the color measurement results of the colorimetry device 17 by controlling the photometry circuit 51 and the colorimetry circuit 52 when the operation of the CCD 20 is stopped. The CPU 39 computes a white balance adjustment value corresponding to the color temperature supplied from the colorimetry circuit 52 using a predetermined table, and supplies the white balance value to the image processor 31.

In other words, when the LCD cover 14 is closed, the LCD 6 cannot be used as an electronic viewfinder, and hence, the operation of the CCD 20 is stopped. The CCD 20 consumes a large amount of electric power. Thus, by stopping the operation of the CCD 20 as described above, the power of the batteries 21 is conserved.

When the LCD cover 14 is closed, the image processor 31 is controlled in such a manner that the image processor 31 does not execute various processes unless the release switch 10 is operated (until the release switch 10 is placed in the half-depressed mode) When the LCD cover 14 is closed, the stop driver 53 is controlled in such manner that the stop driver 53 does not execute operations such as changing of the diameter of the aperture stop 54 unless the release switch 10 is operated (until the release switch 10 is placed in the half-depressed mode).

The CPU 39 causes the strobe 4 to emit light, at the user's discretion (or automatically), by controlling the strobe driving circuit (driver) 37. CPU 39 also causes the red eye reduction LED 15 to emit light, at the user's discretion (or automatically), prior to causing the strobe 4 to emit light by controlling the red eye reduction LED driving circuit (driver) 38. The CPU 39 does not prevent the strobe 4 from emitting light when the LCD cover 14 is open (in other words, when the electronic viewfinder is used). By this process, the object may be shot as an image displayed in the electronic viewfinder.

The CPU 39 records information concerning the date of shooting as header information of the image data, in a shooting image recording area of the memory card 24 according to the date data supplied from the timer 45. (In other words, data of the shooting date is attached to the shooting image data (the actual image) recorded in the shooting image recording area of the memory card 24.) The CPU 39 temporarily records the digitized and compressed sound data after compressing the digitized sound information from the buffer memory 36, and then records it in the predetermined area (sound recording area) of the memory card 24. The data concerning the recording date is recorded simultaneously in the sound recording area of the memory card 24 as header information of the sound data.

The CPU 39 executes an autofocus operation by controlling the lens driving circuit (driver) 30 and by moving the shooting lens 3.

The CPU 39 displays settings and the like for the various operations on the display 26 provided inside the viewfinder by controlling the display circuit 40 inside the viewfinder.

The CPU 39 exchanges data with external apparatus (e.g., a personal computer, not illustrated) through an interface (I/F) 48.

The CPU 39 receives signals from the control keys 7 and process them appropriately.

When a predetermined position in the touch tablet 6A is pressed by a pen (pen type pointing member) 41, which is operated by the user, the CPU 39 reads the X-Y coordinates of the position pressed on the touch tablet 6A and accumulates the coordinate data (memo information to be explained later) in the buffer memory 36. The CPU 39 records the memo information accumulated in the buffer memory 36 in a memo information recording area of the memory card 24 together with the header information, which includes the memo information input date.

Various operations of the electronic camera 1 of the present embodiment are now explained. First, the operation of the electronic viewfinder in the LCD 6 of the present apparatus is described.

When the user half-depresses the release switch 10, the DSP 33 determines, based on the value of the signal corresponding the status of the LCD switch 25 which is supplied from CPU 39, whether or not the LCD cover 14 is open.

If the LCD cover 14 is determined to be closed, the operation of the electronic viewfinder is not executed. In this case, the DSP 33 stops the process until the release switch 10 is operated. As noted above, if the LCD cover 14 is closed, the operation of the electronic viewfinder is not executed. Hence, the CPU 39 stops the operation of the CCD 20, the image processor 31 and the stop driver 53. Additionally, the CPU 39 causes the photometry circuit 51 and the colorimetry circuit 52 to operate, and supplies the measurement results to the image processor 31. The image processor 31 uses the values of measurement result to control the white balance and the brightness value. When the release switch 10 is operated, the CPU 39 causes the CCD 20 and the stop driver 53 to operate.

On the other hand, if the LCD cover 14 is open, the CCD 20 executes an electronic shutter operation using a predetermined exposure time for each predetermined time interval, executes photoelectric conversion of the photo image of the object formed on the CCD 20 by the shooting lens 3, and outputs the resulting image signals to the image processor 31. The image processor 31 controls the white balance and brightness value, executes predetermined processes on the image signals, and then outputs the image signals to the A/D converter 32. In this instance, if the CCD 20 is operating, the image processor 31 uses an adjusted value, which is computed based on the output from the CCD 20 by the CPU 39, to control the white balance and the brightness value. The A/D converter 32 converts the image signal (analog signal) into image data, which is a digital signal, and outputs the image data to the DSP 33. The DSP 33 outputs the image data to the frame memory 35 and causes the LCD 6 to display the image corresponding to the image data.

In this manner, with the electronic camera 1, the CCD 20 operates the electronic shutter with the predetermined time interval when the LCD cover 14 is open, and executes the operation of the electronic viewfinder by converting the signal output from the CCD 20 into image data at predetermined time intervals, outputting the image data to the frame memory 35 and continuously displaying the image of the object on the LCD 6.

Additionally, if the LCD cover 14 is closed as described above, the electronic viewfinder operation is not executed and operation of the CCD 20, the image processor 31 and the stop driver 53 are halted to conserve energy.

Shooting of the object using the present apparatus will now be described.

First, a case in which the continuous shooting mode switch 13 is switched to the S-mode (the mode in which only one frame is shot) will be explained. Power is supplied to the electronic camera 1 by switching the power source switch 11 shown in FIG. 11 to the "ON" position. The shooting process of the object begins when the release switch 10 is pressed after verifying the object with the viewfinder 2.

In this instance, if the LCD cover 14 is closed, the CPU 39 starts operation of the CCD 20, the image processor 31 and the stop driver 53 when the release switch 10 is placed in the half-depressed status, and begins the shooting process of the object when the release switch 10 is placed in the fully-depressed state. The photo image of the object being observed through the viewfinder 2 is gathered by the shooting lens 3 and forms an image on the CCD 20, which includes a plurality of pixels. The photo image that is imaged on the CCD 20 is photoelectrically converted into an image signal by each pixel, and is sampled by the image processor 31. The image signal sampled by the image processor 31 is supplied to the A/D converter 32 where it is digitized, and is output to the DSP 33.

The DSP 33, after outputting the image temporarily to the buffer memory 36, reads the image data from the buffer memory 36, compresses the image data using, for example, the JPEG (Joint Photographic Experts Group) standard, which is a combination of a discrete cosine transformation, quantization, and Huffman encoding. DSP 33 then records the image data in the shooting image recording area of the memory card 24. At this time, the shooting date data is recorded as header information of the shooting image data in the shooting image recording area of the memory card 24.

In this instance, if the continuous shooting mode switching switch 13 is switched to the S-mode, only one frame is shot. Further shooting does not take place even if the release switch 10 is continuously pressed. Additionally, if the release switch 10 is continuously pressed, the image which has been shot is displayed on the LCD when the LCD cover 14 is open.

Second, a case in which the continuous shooting mode switch 13 is switched to the L-mode (the mode in which 8 frames per second are shot continuously) will be explained. Power is introduced to the electronic camera 1 by switching the power source switch 11 to the "ON" position. The shooting process of the object begins when the release switch 10 is pressed.

In this instance, if the LCD cover 14 is closed, the CPU 39 starts operation of the CCD 20, the image processor 31 and the stop driver 53 when the release switch 10 is placed in the half-depressed state, and begins the shooting process of the object when the release switch 10 is placed in the fully-depressed state.

Figure 7:
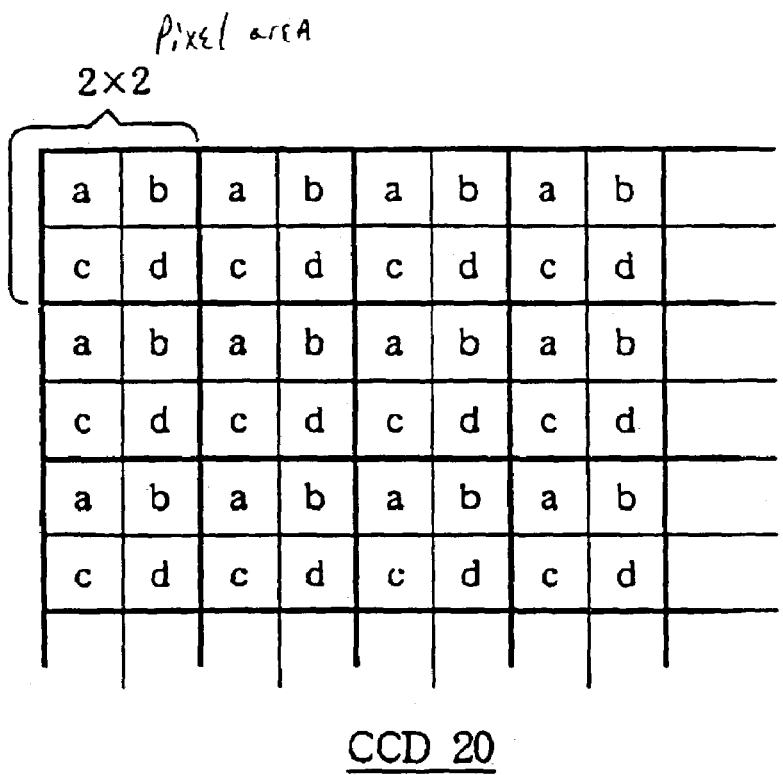
FIG. 7 illustrates a first pixel thinning process.

The photo image of the object observed through the viewfinder 2 is gathered by the shooting lens 3 and forms an image on the CCD 20. The photo image that is imaged on the CCD 20 is photoelectrically converted into image signals by each pixel, and is sampled by the image processor 31 at a rate of 8 times per second. Additionally, the image processor 31 thins out (i.e., ignores or does not use) three-fourths of the pixels of the image signals of all the pixels output by the CCD 20. In other words, the image processor 31 divides the pixels in the CCD 20 into plural areas composed of 2×2 pixels (4 pixels) as shown in FIG. 7, and samples the image signal of one pixel arranged at a predetermined location from each area, thinning out the remaining 3 pixels.

For example, during the first sampling (first frame), the pixel a located on the left upper corner is sampled and the other pixels b, c and d are thinned out. During the second sampling (second frame), the pixel b located on the right upper corner is sampled and the other pixels a, c and d are thinned out. Likewise, during the third and the fourth sampling, the pixels c and d, respectively located at the left lower corner and the right lower corner, are sampled and the rest are thinned out. In short, each pixel is sampled once during four samplings.

The image signals (image signals of one-fourth of all the pixels in the CCD 20) that are sampled by the image processor 31 are supplied to the A/D converter 32 where they are digitized and output to the DSP 33. The DSP 33, after outputting the image temporarily to the buffer memory 36, reads the image data from the buffer memory 36, compresses the image data using, for example, the JPEG method, and records the digitized and compressed shooting image data in the shooting image recording area of the memory card 24. At this time, the shooting date data is recorded as header information of the shooting image data in the shooting image recording area of the memory card 24.

Thirdly, the case in which the continuous shooting mode switch 13 is switched to the H-mode (the mode in which 30 frames are shot per second) is described. Power is introduced to the electronic camera 1 by switching the power source switch 11 to the "ON" position. The shooting process of the object begins when the release switch 10 is pressed.

Here, if the LCD cover 14 is closed, the CPU 39 starts operation of the CCD 20, the image processor 31 and the stop driver 53 when the release switch 10 is placed in the half-depressed state, and begins the shooting process of the object when the release switch 10 is placed in the fully-depressed state.

Figure 8:
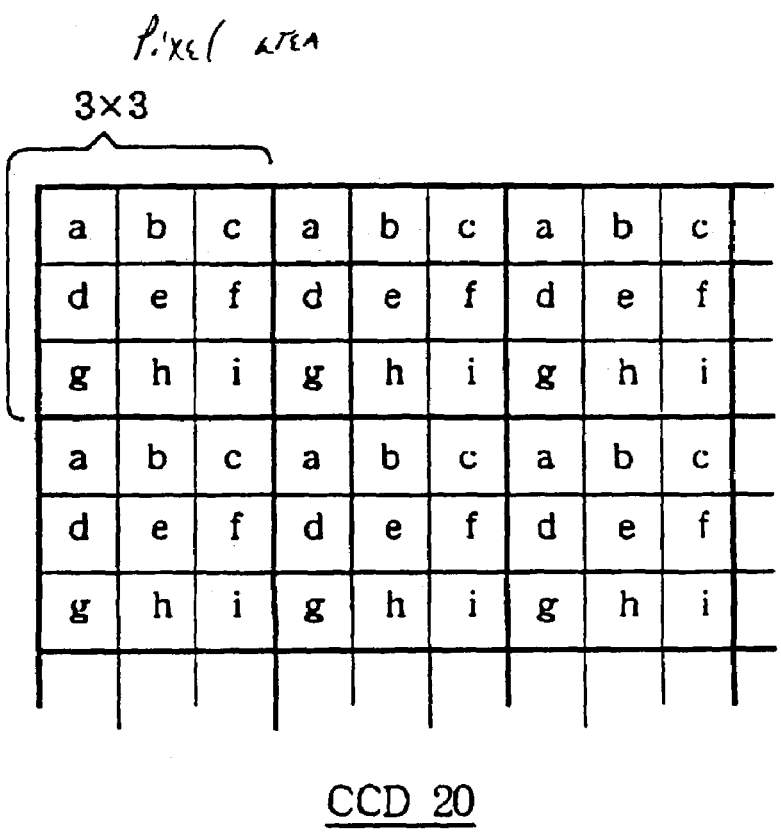
FIG. 8 illustrates a second pixel thinning process.

The optical image of the object observed through the viewfinder 2 is gathered by the shooting lens 3 and is imaged on the CCD 20. The optical image of the object imaged on the CCD 20 is photoelectrically converted to an image signal by each pixel and is sampled 30 times per second by the image processor 31. At this time, the image processor 31 thins out eight-ninths of the pixels in the image signals of all the pixels in the CCD 20. In other words, the image processor 31 divides the pixels in the CCD 20 into areas of 3×3 pixels (9 pixels) as shown in FIG. 8, and samples, 30 times per second, the image signal of one pixel arranged at a predetermined position in each area. The remaining 8 pixels are thinned out. For example, during the first sampling (first frame), the pixel a located on the left upper corner of each area is sampled and the other pixels b through i are thinned out. During the second sampling (second frame), the pixel b located on the right of a is sampled and the other pixels a and c through i are thinned out. Likewise, during the third, fourth and subsequent sampling, the pixel c, the pixel d . . . are sampled, respectively, and the rest are thinned out. In short, each pixel is sampled once for every nine frames.

The image signals (image signals of one-ninth of all the pixels in the CCD 20) that are sampled by the image processor 31 are supplied to the A/D converter 32 where they are digitized and are output to the DSP 33. The DSP 33, after outputting the image temporarily to the buffer memory 36, reads the image data, compresses the image data using, e.g., the JPEG method, and records the digitized and compressed shooting image data in the shooting image recording area of the memory card 24.

With the present camera, light may be shined on the object, if necessary, by operating the strobe 4. However, when the LCD cover 14 is open, or when the LCD 6 executes the electronic viewfinder operation, the CPU 39 prevents the strobe 4 from emitting light.

The operation in which two dimensional line information (pen input information) is input from the touch tablet 6A is now described.

When the touch tablet 6A is pressed by the tip of the pen 41, the X-Y coordinate of the contact point is supplied to the CPU 39. The X-Y coordinate is stored in the buffer memory 36. The CPU 39 writes data at the address in the frame memory 35 that corresponds to each point of the X-Y coordinate, and a memo (i.e., an image) corresponding to the contact point of the pen 41 may be displayed at the corresponding X-Y coordinate in the LCD 6.

As described above, the touch tablet 6A is made of transparent material. Thus, the user is able to view the point (the point corresponding to the location being pressed by the tip of the pen 41) displayed on the LCD 6 through the touch tablet 6A. This gives an impression that the input is made by the pen directly onto the LCD 6. Additionally, when the pen 41 is moved on the touch tablet 6A, a line tracing the motion of the pen 41 is displayed on the LCD 6. If the pen 41 is moved intermittently on the touch tablet 6A, a dotted line tracing the motion of the pen 41 is displayed on the LCD 6. In this manner, the user is able to input memo information of desired letters, drawings and the like (generally referred to as a line drawing or as memo information) to the touch tablet 6A (for display on the LCD 6).

If the memo information is input by the pen 41 when the shooting image is already displayed on the LCD 6, the memo information is synthesized (i.e., combined) with the shooting image information by the frame memory 35 and both are displayed together on the LCD 6.

Additionally, by operating a predetermined pallet, the user is able to choose the color of the memo displayed on the LCD 6 from black, white, red, blue, etc.

If the execution key 7B of control key area 7 is pressed after the memo information is input to the touch tablet 6A by the pen 41, the memo information accumulated in the buffer memory 36 is supplied with header information of the input date to the memory card 24 and is recorded in the memo information area of the memory card 24. In this instance, the memo information recorded in the memory card 24 can be compressed information. The memo information input to the touch tablet 6A contains information with a high spatial frequency component. Hence, if the aforementioned JPEG method is used for compression of the memo information, the compression efficiency becomes poor and the amount of recorded information is not reduced, resulting in a longer time for compression and decompression. Moreover, compression by the JPEG method is lossey compression. Hence it is not suitable for the compression of memo information because it is comprised of a small amount of information. This is because gathering and smearing due to missing information becomes noticeable when the information is decompressed and displayed on the LCD 6.

Hence, in the present embodiment, memo information is compressed using the run length method which is used in facsimile machines and the like. The run length method is a method in which the memo screen is scanned in the horizontal direction and memo information is compressed by encoding each continuous length of information (points) of each color such as black, white, red and blue as well as each continuous length of non-information (where there is no pen input). Using the run length method, memo information is compressed so that a minimum amount of information needs to be stored, and the control of missing information becomes possible when the compressed memo information is decompressed. As another alternative, it is possible to prevent the memo information from being compressed if the information amount is relatively small.

As mentioned above, if the memo information is input by the pen when the shooting image is already displayed on the LCD 6, the pen input is combined with the shooting image information by the frame memory 35 and the combined image of the shooting image and memo is displayed on the LCD 6. On the other hand, the shooting image data is recorded in the shooting image recording area of the memory card 24 and the memo information is recorded in the memo information area of the memory card 24. In this manner, two types of information are recorded in different areas. Hence, the user is able to erase one of the two images (memo, for example) from the combined image of shooting image and memo, enabling further compression of each image information by means of a separate compression method.

Figure 9:
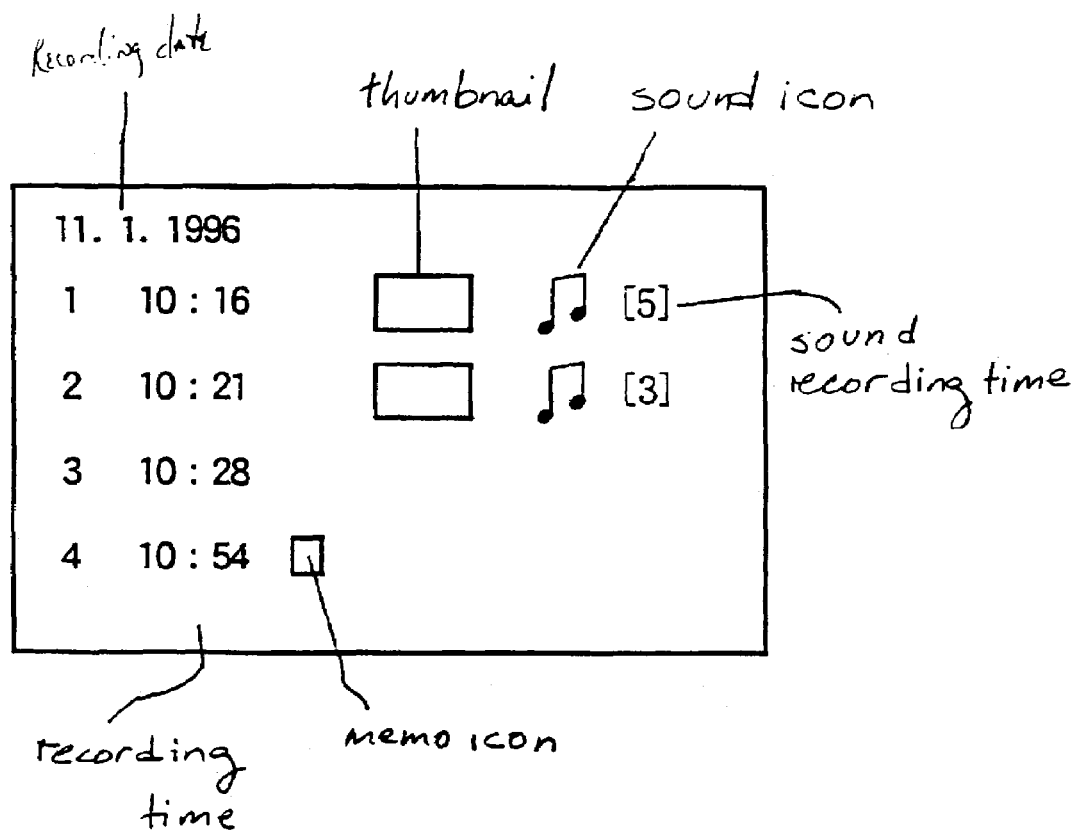
FIG. 9 is an example of a display screen to be displayed on the LCD of the electronic camera.

When data is recorded in the sound recording area, the shooting image recording area, or the memo information recording area of the memory card 24, a table (or listing) of the data may be displayed on the LCD 6, as shown in FIG. 9.

In the display screen of the LCD 6 shown in FIG. 9, the date of recording information (recording date) (Nov. 1, 1996 in this case) is displayed on the upper left section of the screen. The number and the recording time of the information recorded on that recording date are displayed on the left side of the screen below the recording date.

To the right of the recording time, a thumbnail image is displayed (when there is shooting image data for that entry). The thumbnail image is formed by thinning out (reducing) the bit map data of each shooting image data recorded in the memory card 24. Entries having this (thumbnail) display contain shooting image information. In other words, the information recorded (input) at "10:16", and "10:21" contain shooting image information but the other information (entries 3 and 4) do not contain image information.

A memo icon □ indicates that a memo is recorded as line drawing information for a particular entry. Thus, entry 4 includes memo information.

A sound icon □ is displayed to the right of the thumbnail image display area, and a recording time (e.g., in seconds) is displayed to the right of a sound icon (these are not displayed if sound information is not input for a particular entry).

The user selects and designates information to be reproduced by pressing, with the tip of the pen 41, the desired icon in the table displayed on the LCD 6, which is shown in FIG. 9, and the selected information is reproduced by pressing, with the tip of the pen 41, the execution key 7B shown in FIG. 2.

For example, if the sound icon for 10:16 shown in FIG. 9 is pressed by the pen 41, the CPU 39 reads the sound data corresponding to the selected recording date and time (10:16) from the memory card 24, decompresses the sound data, and then supplies the sound data to the A/D and D/A converter 42. The A/D and D/A converter 42 converts the data to analog signals, and then reproduces the sound through the speaker 5.

To reproduce shooting image data recorded in the memory card 24, the user selects the information by pressing the desired thumbnail image with the tip of the pen 41, then reproduces the selected information by pressing the execution key 7B. Then, the CPU 39 instructs the DSP 33 to read the shooting image data corresponding to the selected image shooting date and time of the thumbnail image selected from the memory card 24. The DSP 33 decompresses the shooting image data read from the memory card 24 and accumulates the shooting image data as bit map data in the frame memory 35 for display on the LCD 6.

An image shot in the S-mode is displayed as a still image on the LCD 6. The still image is obviously the image reproduced from the image signals of all of the pixels in the CCD 20.

An image shot in the L-mode is displayed continuously (i.e., as a moving picture) at 8 frames per second on the LCD 6. In this case, the number of pixels displayed in each frame is one-fourth of all of the pixels in the CCD 20. Human vision is sensitive to decreases in the resolution of the still image. Hence, the user may detect the thinning out of the pixels in the still image. However, the shooting speed is increased in the L-mode where images of 8 frames are reproduced per second. Although, the number of pixels in each frame becomes one-fourth of the number of pixels of the CCD 20, the information amount per unit of time is doubled compared to the still image because the human observes the images of 8 frames per second.

In other words, assuming the number of pixels of one frame of the image which is shot in the S-mode to be one, the number of pixels in one frame of the image which is shot in the L-mode becomes one-fourth. When the image (still image) shot in the S-mode is displayed on the LCD 6, the amount of information viewed by the human eye per second is 1 (=(number of pixels 1)×(number of frames 1)). On the other hand, when the image shot in the L-mode is displayed on the LCD 6, the amount of information viewed by the human eye per second is 2 (=(number of pixels ¼)×(number of frames 8)). In other words, twice as much information is viewed by the human eye in the L-mode. Hence, even when the number of pixels in one frame is reduced to one-fourth, the user does not detect much deterioration of the image quality during reproduction.

Moreover, since in the present embodiment different pixels are sampled for each frame and the sampled pixels are displayed on the LCD 6, the user can view an image shot in the L-mode and displayed on the LCD 6 without detecting much deterioration of the image, even when three-fourths of the pixels are thinned out per frame.

An image shot in the H-mode is displayed on the LCD 6 at 30 frames per second. At this time, the number of pixels displayed in each frame is one-ninth of the total number of the pixels of the CCD 20. However, the user can view the image shot in the H-mode and displayed on the LCD 6 without noticing much deterioration of image quality for the same reasons as in the case of the L-mode.

In the present embodiment, when the object is shot in the L-mode or the H-mode, because the image processor 31 thins out the pixels in the CCD 20 in such a manner that the user does not notice much deterioration of the image quality during reproduction, the load on the DSP 33 and the CCD driver 34 is reduced, enabling the low speed and low power operation of these units. Moreover, low cost and low energy consumption operation of the apparatus is achieved.

In the configuration of the present embodiment, the recording of memo (line drawing) information as well as the shooting of the light image of an object are possible. In the configuration of the present embodiment, modes to input these information (shooting mode and memo input mode) are provided which are flexibly selected based on the user's operation, enabling the smooth execution of information input.

Figure 10:
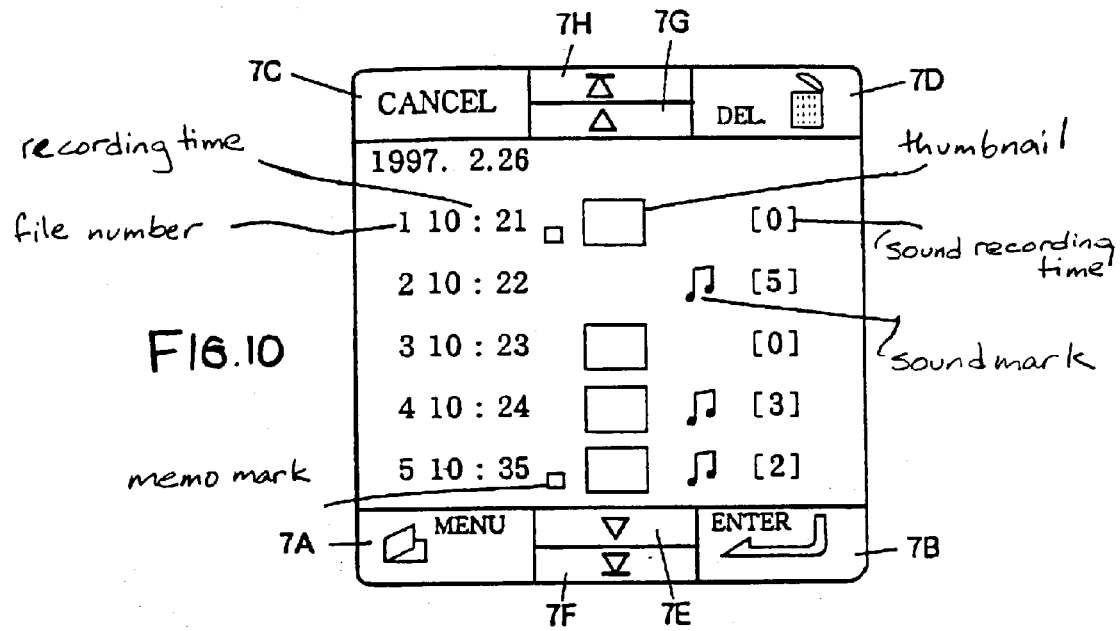
FIG. 10 is an example of a table screen to be displayed on the electronic camera LCD.
Figure 11:
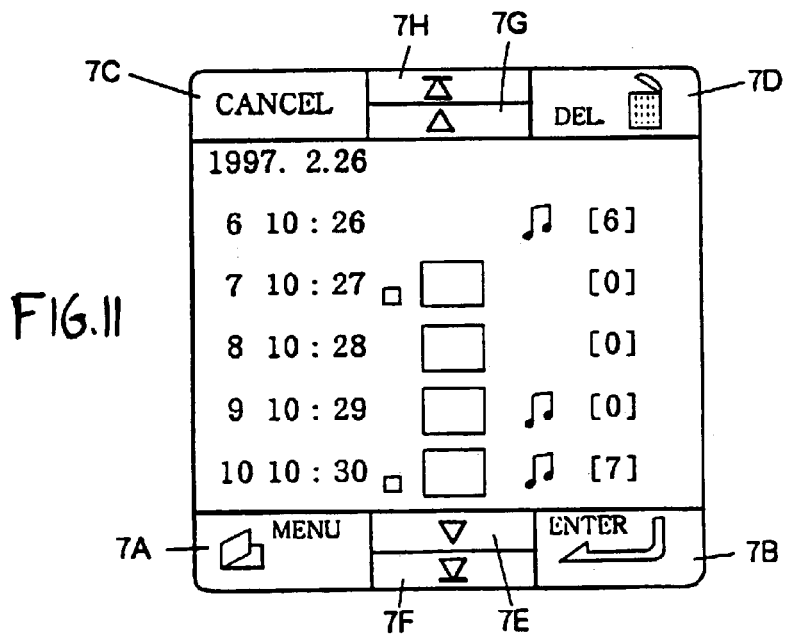
FIG. 11 is another example of a table screen to be displayed on the electronic camera LCD.

FIG. 10 and FIG. 11 show examples of a screen showing a table. Here, five information files are displayed on one page for convenience. As shown on the aforementioned screen showing a table, only image information and line drawing (memo) information are contained in the information files having file numbers 1 and 7. Only audio information is contained in the information files having file numbers 2 and 6. Only image information is contained in the information files having file numbers 3 and 8. In addition, only image information and audio information are contained in the information files having file numbers 4 and 9. Line drawing (memo) information, image information and audio information are contained in the information files having file numbers 5 and 10.

The above information is assumed to be stored on the memory card 24, and the sequence of displaying each item of information is described hereafter, with reference to the flow charts shown in FIG. 12 through FIG. 15.

Figure 12:
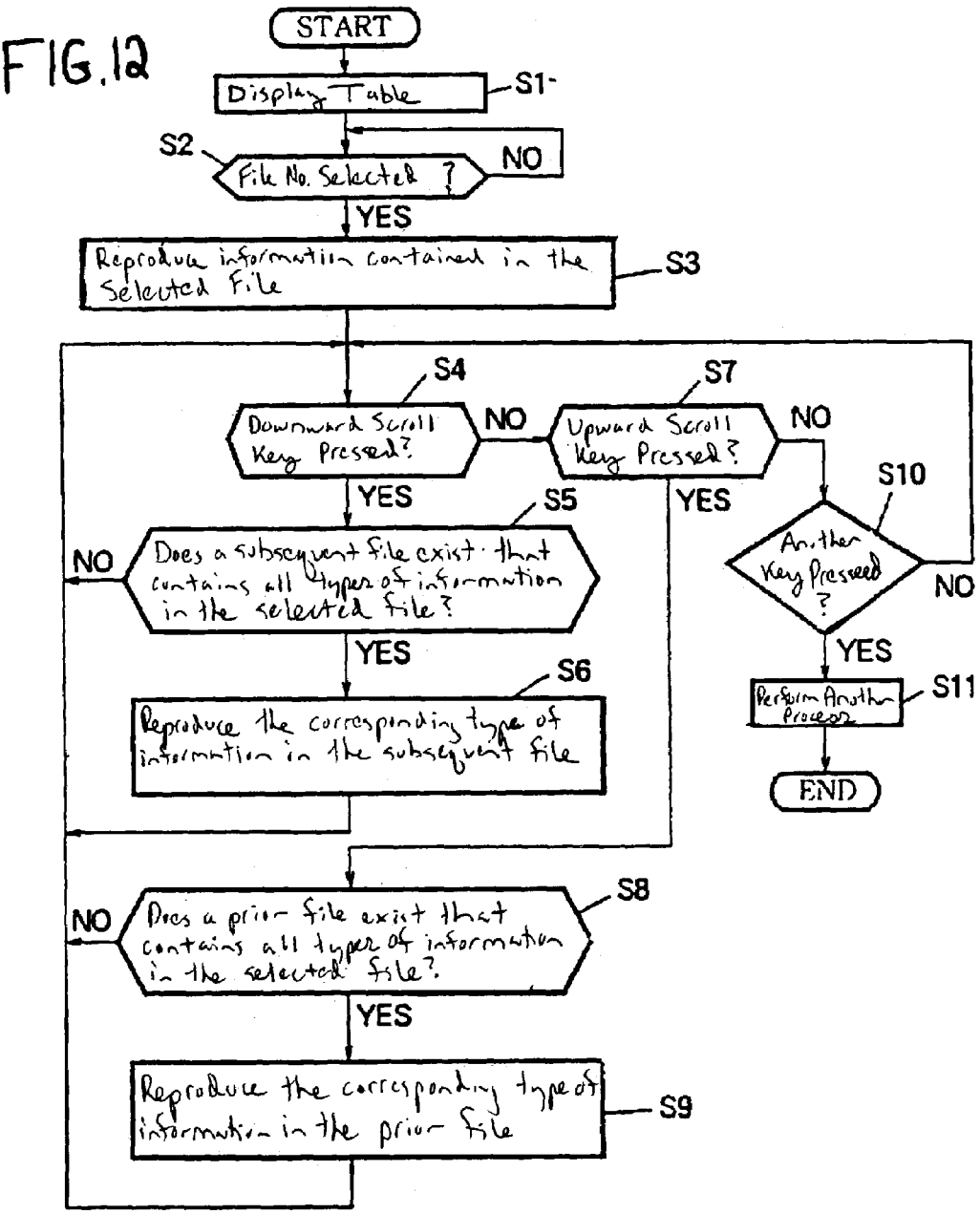
FIG. 12 is a flow chart explaining a procedure in which information files containing all of the types of information contained in a selected information file are searched for and reproduced.

The flow chart shown in FIG. 12 shows a sequence of processes in which the file number of an information file is selected and the information contained in the information file is reproduced. Following this, when the scroll keys (arrow keys) 7E and 7G are pressed, a search is made to locate the information files (if any) that contain all the types of information contained in the selected information file. If any matching information files are located, only the type(s) of information that is the same as the type of information contained in the originally selected information file is reproduced. Thus, for example, if a file is selected that only includes memo information, the search will locate files that include memo information (either alone or along with other types of information). The memo information from the located files would then be reproduced.

First, in step S1, a screen showing a table such as is shown in FIG. 10 is displayed on the LCD 6. Next, in step S2, a determination is made as to whether or not a file number has been selected. When it is determined that a file number has not been selected, the process in step S2 is repeatedly executed. On the other hand, when it is determined that a file number has been selected, the program moves to step S3. In this instance, it will be assumed that the information file having file number 1 has been selected.

In step S3, all of the information contained in the information file having the file number selected in step S2 is reproduced. In the present case, line drawing information and image information are contained in the information file having the file number 1. Consequently, line drawing information and image information from file number 1 are reproduced and are displayed on the LCD 6.

Next, in step S4, a determination is made as to whether or not the downward scroll key (arrow key) 7E has been pressed. When it is determined that the downward arrow key 7E has been pressed, the program moves to step S5, and a determination is made as to whether or not an information file containing all types of information contained in the selected information file exists after the information file containing the information currently reproduced.

When it is determined that an information file containing all of the types of information contained in the selected information file exists after the information file containing the information currently reproduced, the program moves to step S6. In step S6, the information of the type contained in the selected information file, contained in the next information file containing all of the types of information contained in the selected information file is reproduced. In the present case, line drawing information and image information are contained in the information files having file numbers 5, 7, and 10. Hence, the image information and line drawing information contained in the information file having the file number 5 are reproduced.

Next, the program returns to step S4 and the processes in steps S4 through S6 are repeatedly executed, and the image information and line drawing information contained in the information files having file numbers 7 and 10 are reproduced (assuming the downward arrow key is repeatedly pressed). Thus, when it is determined in step S4 that the downward arrow key 7E has been pressed, the program moves to step S5 and, in the case of this example, information files containing line drawing information and image information exist, so the line drawing information and image information contained in the information file having the file number 7 are reproduced next. Furthermore, the line drawing information and image information contained in the information file having the file number 10 are similarly reproduced. When the process in step S6 has been concluded, the program returns to step S4.

In addition, the program also returns to step S4 when it is determined in step S5 that information files containing all of the types of information contained in the selected information file do not exist.

On the other hand, when it is determined in step S4 that the downward arrow key 7E has not been pressed, the program moves to step S7 and a determination is made as to whether or not the upward arrow key (scroll key) 7G has been pressed. When it is determined that the upward arrow key 7G has not been pressed, the program moves to step S10 and a determination is made as to whether or not another key has been pressed. When it is determined that another key has not been pressed, the program returns to step S4 and the processes from step S4 on are repeatedly executed.

When it is determined in step S7 that the upward arrow key 7G has been pressed, the program moves to step S8, and a determination is made as to whether or not information files containing all of the types of information in the information file selected in step S2 exist prior to the information file containing the information currently reproduced. When it is determined that information files containing all of the information in the selected information file exist prior to the information file containing the information currently reproduced, the program moves to step S9. In step S9, the information of the above-described types in a prior information file containing all of the types of information contained in the selected information file is reproduced.

Now, assuming that the line drawing information and image information contained in the information file having file number 10 are reproduced (by the information file having file number 1 originally being selected), because information files containing image information and line drawing information (information files having file numbers 1, 5 and 7) exist prior to file number 10, in step S9 the line drawing information and image information contained in the information file having file number 7 positioned prior to the information file having file number 10 are reproduced.

When it is determined in step S8 that no information files containing all of the information in the selected information file exist prior to the information file containing the information currently reproduced, or when the process in step S9 is concluded, the program returns to step S4 and the processes from step S4 on are repeatedly executed. In the present example, file numbers 5 and 1 are reproduced in sequence each time the arrow key 7G is pressed.

In addition, when it is determined in step S10 that another key has been pressed, the program moves to step S11, and after another process (corresponding to the selected key) has been executed, the process is concluded.

In this manner, when a file number is selected, the reproduction of the information in the information files containing all of the types of information contained in the selected file is accomplished.

Figure 13:
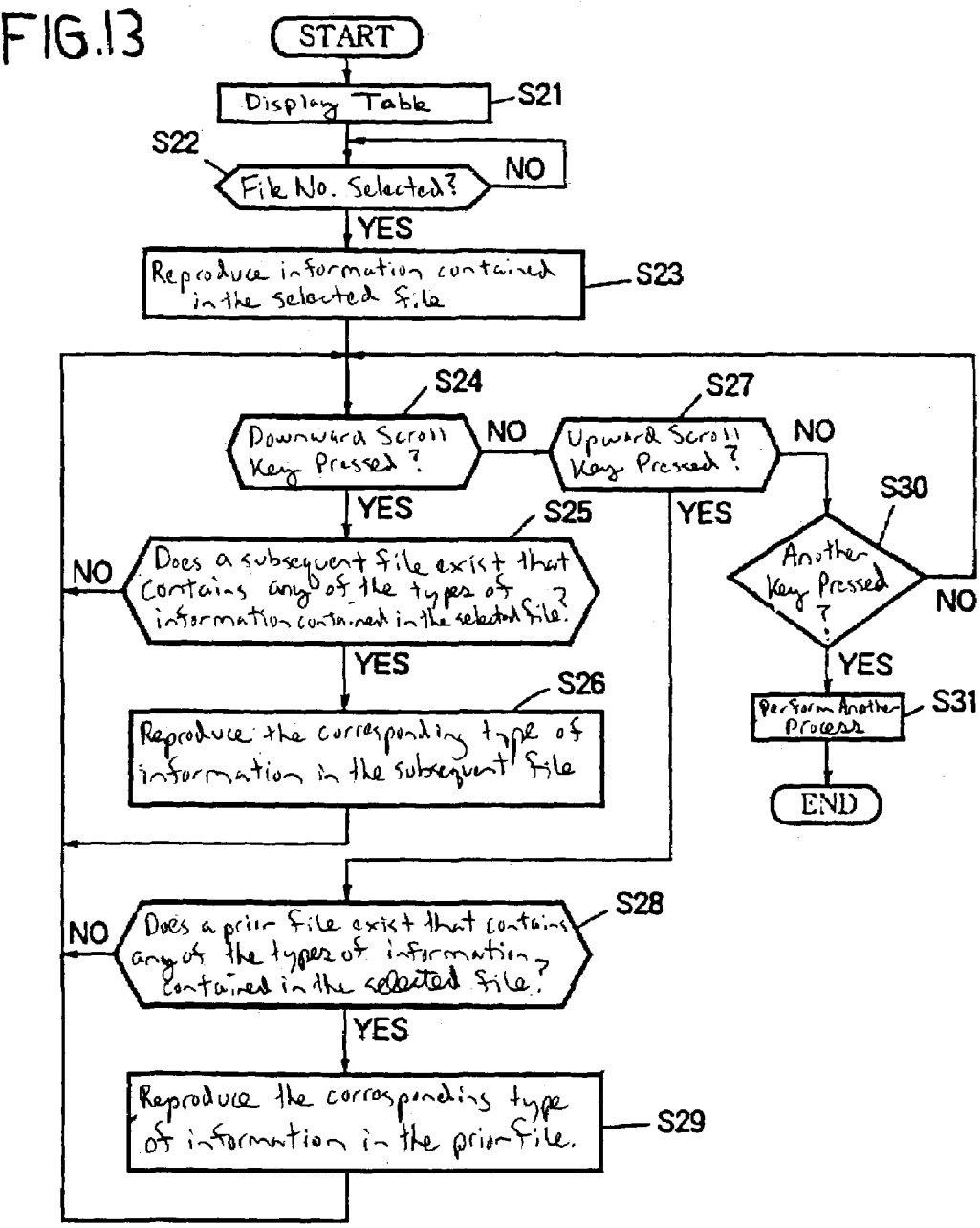
FIG. 13 is a flow chart explaining a procedure in which information files containing any of the types of information contained in a selected information file are searched for and reproduced.

The flow chart shown in FIG. 13 shows a sequence of processes such that when a scroll key (arrow key) 7E or 7G is pressed after the file number of an information file has been selected and the information contained in that information file has been reproduced, a search is performed to locate information files containing any (rather than all) of the types of information contained in the selected information file. Then, if any matching information files are located, the type(s) of information that is the same as the type of information contained in the file number which has been selected are reproduced, from among the information contained in the matching information files. Thus, for example, if a file is selected that includes sound information and image information, the sound information and/or image information from any file that contains either or both types of information (and possibly additional types of information) can be reproduced.

First, in step S21, a screen showing a table such as the one shown in FIG. 10 is displayed on the LCD 6. Next, in step S22, a determination is made as to whether or not a file number has been selected. When it is determined that a file number has not been selected, the process in step S22 is repeatedly executed. On the other hand, when it is determined that a file number has been selected, the program moves to step S23. Here, it will be assumed that the information file having file number 5 has been selected.

In step S23, the line drawing information, image information and audio information contained in the information file having file number 5 selected in step S22 are reproduced. Next, the program moves to step S24 and a determination is made as to whether or not the downward arrow key 7E has been pressed. When it is determined that the downward arrow key 7E has been pressed, the program moves to step S25, where a determination is made as to whether or not an information file containing any of the types of information contained in the selected information file exists after the information file currently being reproduced.

When it is determined that an information file containing any of the types of information contained in the selected information file exists after the information file currently being reproduced, the program moves to step S26 where the next information file containing any of the types of information contained in the selected information file is reproduced. In the case of the present example, the information file having the file number 5 contains line drawing information, image information and audio information, and hence information files containing any of these types of information are reproduced. Thus, the information file having the file number 6 is reproduced next. This information file contains only audio information, so only audio information is reproduced.

In addition, when it is determined in step S25 that no later information files containing any of the types of information contained in the selected information file exist, or when the process in step S26 is concluded, the program returns to step S24 and the processes from step S24 on are repeatedly executed. Each time the downward cursor key 7E is pressed, the processes from step S24 on are repeatedly executed. In the case of the present example, the information files having file numbers from 6 on are reproduced in succession.

In addition, when it is determined in step S24 that the downward arrow key 7E has not been pressed, the program moves to step S27 where a determination is made as to whether or not the upward arrow key 7G has been pressed. When it is determined that the upward arrow key 7G has been pressed, the program moves to step S28 where a determination is made as to whether or not a prior information file containing any of the types of information contained in the selected information file exists.

When it is determined that a prior information file containing any of the types of information contained in the selected information file exists, the program moves to step S29, and the prior information file containing any of the types of information contained in the selected information file is reproduced.

For example, assuming that the processes from steps S24 through S26 have been repeatedly executed and at present the information contained in the information file having file number 10 is being reproduced, it is determined in step S27 that a prior information file containing any of the types of information contained in the selected information file exists, so the prior information file, in the present case the information file having file number 9, containing any of the types of information contained in the selected information file is reproduced.

Furthermore each time the upward arrow key 7G is pressed, in the present case, the information contained in the information files 8, 7, 6, 5, 4, 3, 2 and 1 is reproduced in that order.

In addition, when it is determined in step S27 that the upward arrow key 7G has not been pressed, the program moves to step S30 where a determination is made as to whether or not another key has been pressed. When it is determined that another key has been pressed, another process is executed in step S31, following which the processes are concluded.

In this manner, by first selecting a file number for a specific information file and then pressing the arrow keys 7E and 7G, the information of the same type, in information files containing any of the types of information contained in the information file first selected, is reproduced in order each time an arrow key 7E or 7G is selected.

Figure 14:
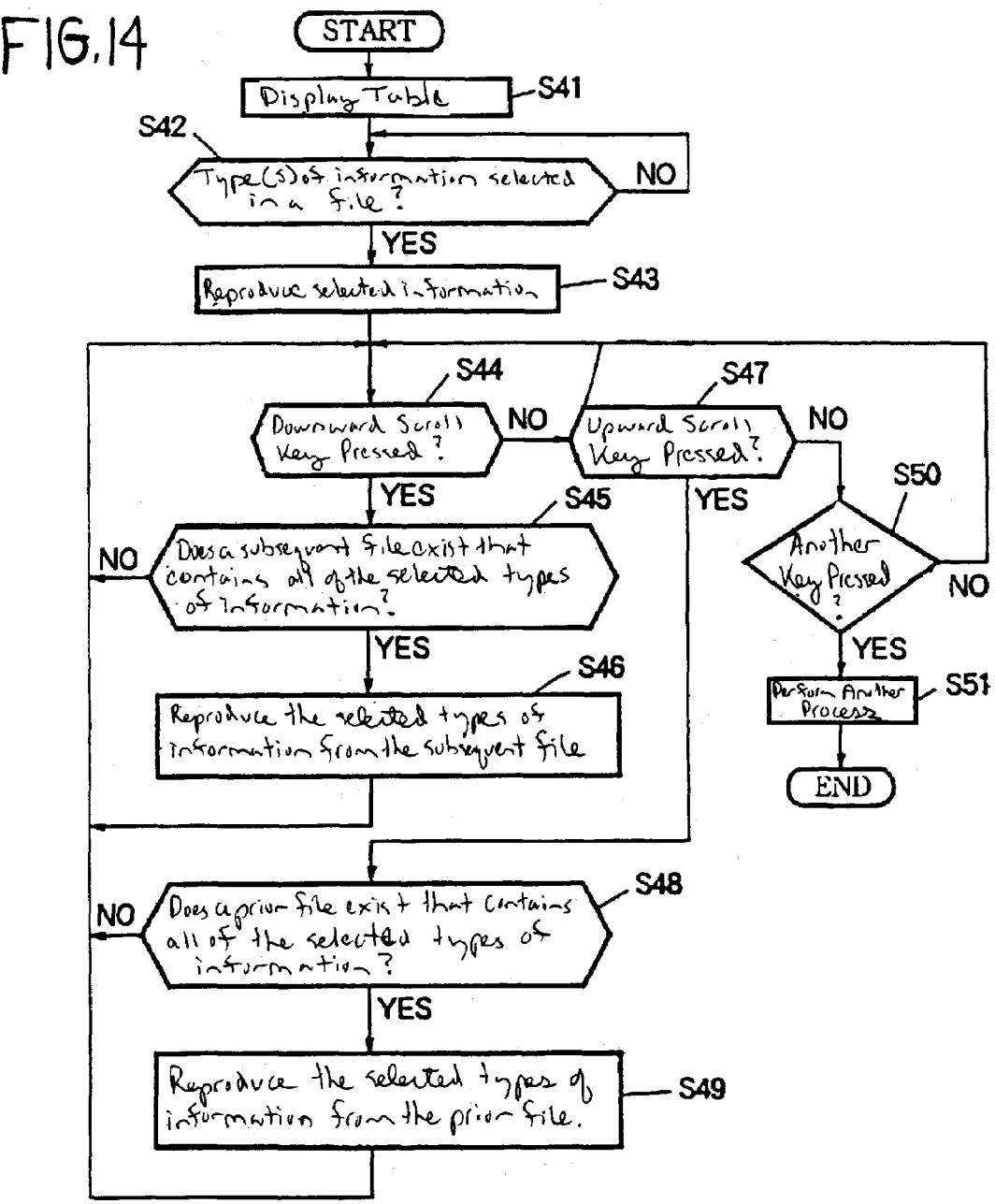
FIG. 14 is a flow chart explaining a procedure in which information files containing all of the types of selected information are searched for and reproduced.

The flow chart in FIG. 14 shows a sequence of processes such that when a scroll key (arrow key) 7E or 7G is pressed after specific information contained in a specific information file has been selected and the selected information has been reproduced (rather than selecting the file number in FIG. 12), a search is performed to locate information files containing all of the types of selected information. The selected information is then reproduced from any information files that match the search criteria.

First, in step S41, a screen showing a table such as the one shown in FIG. 10 is displayed on the LCD 6. Next, in step S42 a determination is made as to whether or not one or a plurality of information items in a specific information file have been selected. When it is determined that one or a plurality of information items in the specific information file have not been selected, the process in step S42 is repeatedly executed. On the other hand, when it is determined that one or a plurality of information items in the specific information file have been selected, the program moves to step S43 where the selected information is reproduced.

In this instance, it will be assumed that the thumbnail image (image information) and the audio icon (audio information) have been selected from the information file having the file number 1. Note that while audio information is not contained in the information having the file number 1, audio can still be selected. This is because the selection of information in this instance becomes the criteria for searching, as explained hereafter. Furthermore, in the case of the present example, only the image information in the information file having the file number 1 is reproduced.

Next, in step S44, a determination is made as to whether or not the downward arrow key 7E has been pressed. When it is determined that the downward arrow key 7E has been pressed, the program moves to step S45 where a determination is made as to whether or not an information file containing all of the types of selected information exists after the information file currently being reproduced. When it is determined that an information file containing all of the types of selected information exists after the information file currently being reproduced, the program moves to step S46 and the selected information in the next information file containing all of the types of selected information is reproduced.

When it is determined in step S45 that an information file containing all of the types of selected information does not exist after the information file currently being reproduced, or when the process in step S46 is concluded, the program returns to step S44 and the processes from step S44 on are repeatedly executed.

In the present case, the image information and the audio information in the information file having the file number 1 were selected. Hence each time the downward arrow key 7E is pressed, the information files having file numbers 4, 5, 9 and 10 are reproduced in order.

On the other hand, when it is determined in step S44 that the downward arrow key 7E has not been pressed, the program moves to step S47 where a determination is made as to whether or not the upward arrow key 7G has been pressed. When it is determined that the upward arrow key 7G has been pressed, the program moves to step S48 where a determination is made as to whether or not an information file containing all of the types of selected information exists prior to the information file currently being reproduced. When it is determined that an information file containing all of the types of selected information exists prior to the information file currently being reproduced, the information in the information file containing all of the types of selected information is reproduced in step S49.

In addition, when it is determined in step S48 that an information file containing all of the types of selected information does not exist prior to the information file currently being reproduced, or when the process in step S49 is concluded, the program returns to step S44 and the processes from step S44 on are then repeatedly executed.

For example, assume that the downward cursor key 7E has been pressed twice and the image information and audio information in the information file having the file number 9 are currently being reproduced. In this state, when the upward arrow key 7G is pressed, it is determined in step S48 that an information file containing all of the types of selected information exists prior to the information file currently being reproduced, so in step S49 the image information and audio information in the information file having the file number 5 are reproduced. When the upward arrow key 7G is pressed again, this time the image information and the audio information in the information file having the file number 4 are reproduced.

In addition, when it is determined in step S47 that the upward arrow key 7G has not been pressed, the program moves to step S50 where a determination is made as to whether or not another key has been pressed. When it is determined that another key has been pressed another process is executed in step S51 and the process then concludes.

As indicated above, by first selecting specific information in a specific information file and then pressing an arrow key 7E or 7G, the selected type of information in the information file containing all of the types of information selected first are reproduced in order each time the arrow keys 7E and 7G are pressed.

Figure 15:
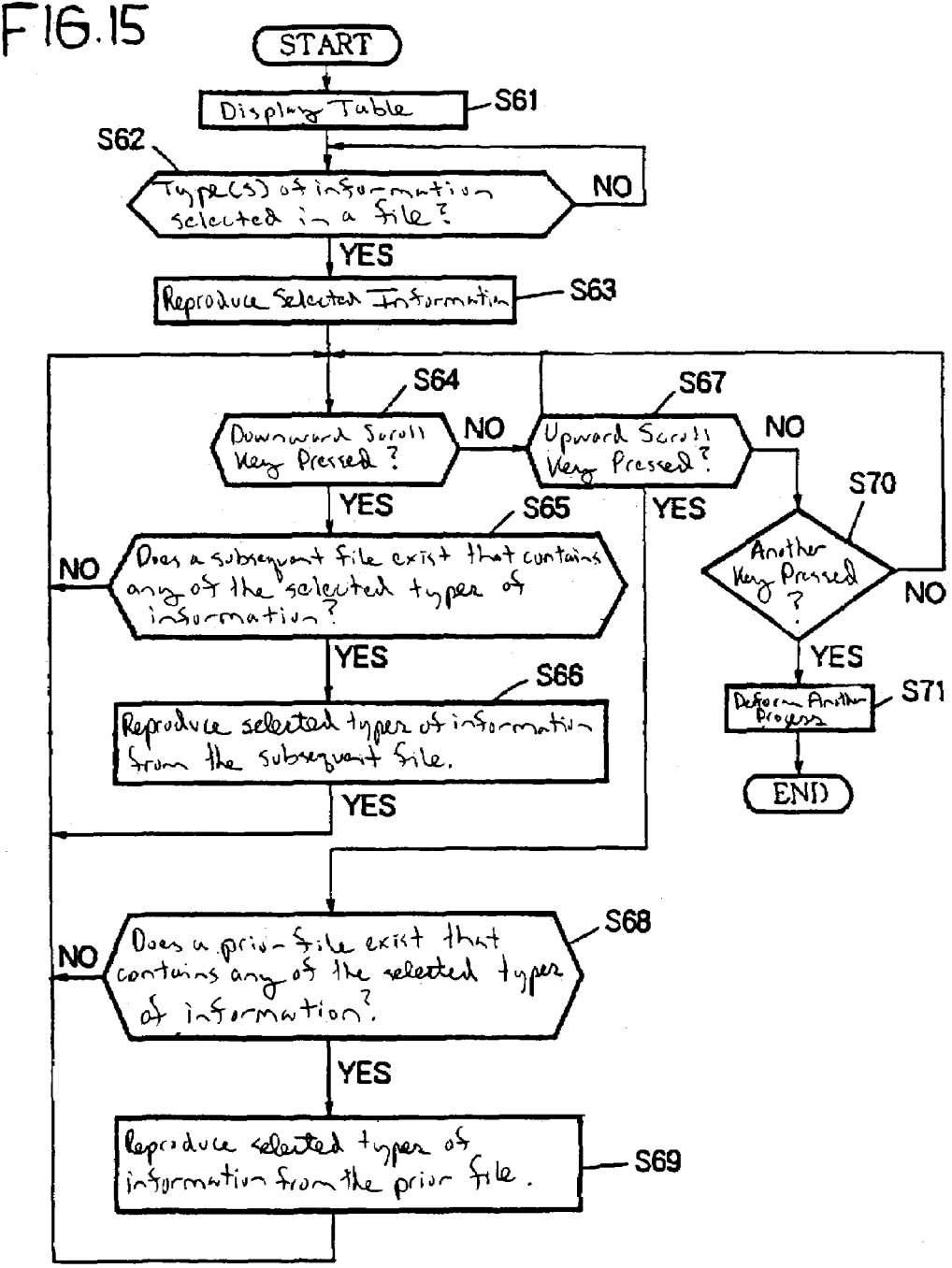
FIG. 15 is a flow chart explaining a procedure in which information files containing any of the types of selected information are searched for and reproduced.

The flow chart shown in FIG. 15 shows an example such that when a scroll key (arrow key) 7E or 7G is pressed after specific information contained in a specific information file is selected and the selected information is reproduced, a search is performed to locate information files containing any of the types of selected information. Then, the information matching any of the types of information selected first, out of the information contained in any matching information files, is reproduced.

First, in step S61, a screen showing a table such as the one shown in FIG. 10 is displayed on the LCD 6. Next, in step S62 a determination is made as to whether or not one or a plurality of information items in a specific information file have been selected. When it is determined that one or a plurality of information items in the specific information file have not been selected, the process in step S62 is repeatedly executed. On the other hand, when it is determined that one or a plurality of information items in the specific information file have been selected, the program moves to step S63 where the selected information is reproduced. Here, it is assumed that the memo icon (line drawing information) and the thumbnail image (image information) have been selected out of the information file having the file number 1.

Next, in step S64, a determination is made as to whether or not the downward arrow key 7E has been pressed. When it is determined that the downward arrow key 7E has been pressed, the program moves to step S65 where a determination is made as to whether or not an information file containing any of the types of selected information exists after the information file currently being reproduced. When it is determined that an information file containing any of the types of selected information exists after the information file currently being reproduced, the program moves to step S66 and the information matching any of the types of selected information in the next information file containing any of the types of selected information is reproduced.

In addition, when it is determined in step S65 that an information file containing any of the types of selected information does not exist after the information file currently being reproduced, or when the process in step S66 is concluded, the program returns to step S64 and the processes from step S64 on are repeatedly executed.

In the present example, the line drawing information and the image information in the information file having the file number 1 were selected. Hence, each time the downward arrow key 7E is pressed, the information files having file numbers 3, 4, 5, 7, 8, 9 and 10 are reproduced in order.

When it is determined in step S64 that the downward arrow key 7E has not been pressed, the program moves to step S67 where a determination is made as to whether or not the upward arrow key 7G has been pressed. When it is determined that the upward arrow key 7G has been pressed, the program moves to step S68 where a determination is made as to whether or not an information file containing any of the types of selected information exists prior to the information file currently being reproduced. When it is determined that an information file containing any of the types of selected information exists prior to the information file currently being reproduced, the information matching any of the types of selected information in the information file containing any of the types of selected information is reproduced in step S69.

When it is determined in step S68 that an information file containing any of the types of selected information does not exist prior to the information file currently being reproduced, or when the process in step S69 is concluded, the program returns to step S64 and the processes from step S64 on are then repeatedly executed.

For example, assume that the downward cursor key 7E has been pressed three times and the line drawing information and image information in the information file having the file number 5 are currently being reproduced. In this state, when the upward arrow key 7G is pressed, it is determined in step S68 that an information file containing any of the types of selected information exists prior to the information file currently being reproduced. Thus, in step S69 the line drawing information (none) and image information in the information file having the file number 4 are reproduced. Furthermore, each time the upward arrow key 7G is pressed, the line drawing information (if any) and the image information (if any) in the information files having the file numbers 3 and 1 are reproduced in order.

In addition, when it is determined in step S67 that the upward arrow key 7G has not been pressed, the program moves to step S70 where a determination is made as to whether or not another key has been pressed. When it is determined that another key has been pressed another process is executed in step S71 and the process then concludes.

As indicated above, by first selecting specific information in a specific information file and then pressing an arrow key 7E or 7G, the selected type of information in the information files containing any of the types of information selected first are reproduced in order each time the arrow keys 7E and 7G are pressed.

The program that causes the processes shown in the flow charts in FIG. 12 through FIG. 15 to be executed can be stored in the ROM 43 or the memory card 24 of the electronic camera 1. In addition, this program may be supplied to the user stored in the ROM 43 or the memory card 24 beforehand, or may be supplied to the user stored in a CD-ROM (compact disk-read only memory) or the like so as to be copyable to the ROM 43 or to the memory card 24. In this case, the ROM 43 is comprised of an EEPROM (electrically erasable and programmable read only memory) that can be electrically overwritten. Additionally, the program(s) can be supplied to the user over a communications network, for example, the Internet (World Wide Web).

The layout of the screen display in the configuration of the above-described embodiment is one example, and is not intended to be limiting.

Furthermore, in the configuration of the above-described embodiment, when information in a specific information file is selected as the criteria for searching, the information can be selected even if this information is not contained in that information file. It is, however, also possible to make it impossible to select as the criteria for searching information not contained in a particular information file.

Furthermore it is also possible for the user to make selection using a menu screen or the like of one of the above-described plurality of search methods.

The touch tablet can be activable by a user's finger rather than by a separate pen. Additionally, other selection techniques can be used with the invention. For example a cursor that is movable via a mouse and that makes selections upon clicking of the mouse can be used with the invention.

In the illustrated embodiment, the invention was implemented by programming a general purpose computer (CPU 39). However, the controller of the invention can be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flow charts shown in FIGS. 12–15 can be used as the controller.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An information processing apparatus that reproduces information from a plurality of information files that include one or more types of information, the information processing apparatus comprising:
    designating means for designating one of the information files;
    setting means for setting a search condition based on the one or more types of information contained in the information file designated by the designating means, the setting means sets the search condition so as to extract an information file that contains at least one of the types of information contained in the designated information file designated by the designating means;
    search means for searching the information files based on the search condition set by the setting means to locate a matching information file; and
    reproduction means for reproducing the one or more types of information corresponding to the search condition and contained in the matching information file based on the searching performed by the search means.

2. The information processing apparatus of claim 1, wherein the setting means sets the search condition so as to extract an information file that contains all of the types of information in the designated information file designated by the designating means.

3. The information processing apparatus of claim 1, wherein the types of information includes image information, line drawing information and audio information.

4. The information processing apparatus of claim 1, wherein the apparatus is an electronic camera, the electronic camera including a photographic lens that forms a light image of an object on a photoelectric converter that converts the light image into image signals, the image signals being one of the types of information.

5. The information processing apparatus of claim 4, further comprising a touch tablet through which line drawing information is input to the electronic camera, the line drawing information being another one of the types of information.

6. An information processing apparatus that reproduces information from a plurality of information files that include one or more types of information, the information processing apparatus comprising:
    a designating device that designates one of the information files; and
    a controller coupled to the designating device to (i) set a search condition based on the one or more types of information contained in the information file designated by the designating device, the controller sets the search condition so as to extract an information file that contains at least one of the types of information contained in the designated information file designated by the designating device, and (ii) search the information files based on the set search condition to locate a matching information file, the controller reproducing the one or more types of information corresponding to the search condition and contained in the matching information file based on the searching performed by the controller.

7. The information processing apparatus of claim 6, wherein the controller sets the search condition so as to extract an information file that contains all of the types of information in the designated information file designated by the designating device.

8. The information processing apparatus of claim 6, wherein the types of information includes image information, line drawing information and audio information.

9. The information processing apparatus of claim 6, wherein the apparatus is an electronic camera, the electronic camera including a photographic lens that forms a light image of an object on a photoelectric converter that converts the light image into image signals, the image signals being one of the types of information.

10. The information processing apparatus of claim 9, further comprising a touch tablet through which line drawing information is input to the electronic camera, the line drawing information being another one of the types of information.

11. The information processing apparatus of claim 6, wherein the designating device includes a touch tablet.

12. The information processing apparatus of claim 6, wherein the designating device includes a user interface that displays a list of the information files by which the one or more types of information is designated.

13. A method of reproducing information from a plurality of information files that include one or more types of information, the method comprising the steps of:
    designating one of the information files;
    setting a search condition based on the one or more types of information contained in the designated information file, the setting step sets the search condition so as to extract an information file that contains at least one of the types of information contained in the designated information file;
    searching the information files based on the set search condition to locate a matching information file; and
    reproducing the one or more types of information corresponding to the search condition and contained in the matching information file based on the searching performed in the searching step.

14. The method of claim 13, wherein the setting step sets the search condition so as to extract an information file that contains all of the types of information in the designated information file.

15. The method of claim 13, wherein the types of information includes image information, line drawing information and audio information.

16. The method of claim 13, wherein the method is performed in an electronic camera, the electronic camera including a photographic lens that forms a light image of an object on a photoelectric converter that converts the light image into image signals, the image signals being one of the types of information.

17. The method of claim 16, wherein the electronic camera also includes a touch tablet through which line drawing information is input to the electronic camera, the line drawing information being another one of the types of information.

18. The method of claim 13, wherein the designating step is performed by operating a touch tablet.

19. The method of claim 13, wherein the designating step is performed by making at least one selection from a list of the information files displayed as a user interface.

20. A recording medium that stores a computer-readable control program for controlling an information processing apparatus that reproduces information from a plurality of information files that include one or more types of information, the control program including instructions that cause the information processing apparatus to:

receive a designation of one of the information files;

set a search condition based on the one or more types of information contained in the designated information file, the instruction to set the search condition sets the search condition so as to extract an information file that contains at least one of the types of information contained in the designated information file;

search the information files based on the set search condition to locate a matching information file; and reproduce the one or more types of information corresponding to the search condition and contained in the matching information file based on the search.

21. The recording medium of claim 20, wherein the types of information that can be designated includes image information, line drawing information and audio information.

22. The recording medium of claim 20, wherein the instruction to set the search condition sets the search condition so as to extract an information file that contains all of the types of information in the designated information file.

* * * * *